(12) United States Patent
Zhou et al.

(10) Patent No.: US 7,272,294 B2
(45) Date of Patent: Sep. 18, 2007

(54) WIRELESS COMMUNICATION SYSTEM AND RECEIVING DEVICE

(75) Inventors: Liang Zhou, Kawasaki (JP); Michiharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/415,113

(22) Filed: May 2, 2006

(65) Prior Publication Data

US 2007/0196072 A1  Aug. 23, 2007

(30) Foreign Application Priority Data

Feb. 21, 2006  (JP) .............................. 2006-043794

(51) Int. Cl.
   *G02B 6/00* (2006.01)
   *H04L 27/00* (2006.01)
   *H04J 15/00* (2006.01)

(52) U.S. Cl. ...................................... 385/147; 375/316

(58) Field of Classification Search ................ 375/260, 375/316, 340; 385/147; 370/208
   See application file for complete search history.

(56) References Cited

U.S. PATENT DOCUMENTS

| | | | |
|---|---|---|---|
| 2003/0002450 A1 | 1/2003 | Jalili et al. .................... | 370/294 |
| 2004/0121827 A1 | 6/2004 | Murakami et al. ......... | 455/575.7 |
| 2005/0180517 A1* | 8/2005 | Abe ............................ | 375/260 |
| 2005/0181737 A1 | 8/2005 | Kobayashi et al. ........... | 455/69 |
| 2006/0222092 A1* | 10/2006 | Guo et al. ................... | 375/260 |

FOREIGN PATENT DOCUMENTS

| | | |
|---|---|---|
| JP | 2003-530010 A | 10/2003 |
| JP | 2004-254285 A | 9/2004 |
| JP | 2004-304760 A | 10/2004 |
| JP | 2004-534456 A | 11/2004 |
| WO | 01/76110 A | 10/2001 |

* cited by examiner

*Primary Examiner*—Sung Pak
*Assistant Examiner*—Daniel Petkovsek
(74) *Attorney, Agent, or Firm*—Bingham McCutchen LLP

(57) ABSTRACT

The present invention is to provide a wireless communication system and a receiving device each capable of restraining a circuit scale and obtaining an excellent error rate performance. In a wireless communication system in which a transmitting device and a receiving device communicate in an orthogonal frequency division multiplexing system, the transmitting device includes a partition unit partitioning a transmission data sequence into a plurality of data streams and a mapping unit mapping the plurality of data streams to each of transmitting antennas by using, for a precoding matrix, columns, corresponding to a stream count of the plurality of data streams, of a right singular matrix acquired by singular value decomposition of a channel matrix, and the receiving device includes a decoding unit that Viterbi-decodes the received signals by weighting a path metric by using a weighting coefficient corresponding to a signal-to-noise ratio obtained from the present channel matrix.

10 Claims, 17 Drawing Sheets

WIRELESS COMMUNICATION SYSTEM AND RECEIVING DEVICE

BACKGROUND OF THE INVENTION

1. Field of the Invention

The present invention relates to a wireless communication system and a receiving device that utilize MIMO (Multiple Input Multiple Output)-OFDM (Orthogonal Frequency Division Multiplexing).

2. Description of the Related Art

A MIMO (Multi Input and Multi Output) communication system exists as a communication system capable of increasing transmission rates (capacity of transmission) by transmitting the same or different data simultaneously from a plurality of antennas by use of the same frequency band. The MIMO communication system is that transmission data are split into Ns-pieces of different data streams, and the respective transmission data streams are simultaneously transmitted from a plurality (Nt-pieces) of transmitting antennas, and these transmitted signals are multiplexed through a variety of communication paths and thus received by a plurality (Nr-pieces) of receiving antennas.

The MIMO receiving device separates, based on the signals received from the receiving antennas, for example, the MIMO channels into Ns-pieces of independent channels, thereby estimating a channel status. Information on this estimated channel status (which will hereinafter be referred to as channel status information (CSI)) is sent to the MIMO transmitting device, wherein the MIMO transmitting device utilizes the CSI for adaptive modulation, adaptive transmission power control, precoding and so on.

There is a MIMO-OFDM wireless communication system as a next generation wireless communication system in which OFDM (Orthogonal Frequency Division Multiplexing) defined as a multi-carrier transmission method is applied to this MIMO transmission method. FIG. 17 is a diagram showing an example of a device configuration of a MIMO-OFDM wireless communication transmitting device that uses a conventional linear precoder. The transmitting device shown in FIG. 17 includes an error correction coding unit (which will hereinafter be referred to as an FEC (Forward Error Correction) encoder) 10, a puncturing unit 11, a serial/parallel converting unit (which will hereinafter be abbreviated to an S/P converting unit) 12, frequency interleavers 13-1 through 13-Ns, constellation mappers 14-1 through 14-Ns, a preceding unit 15, inverse fast Fourier transform (which will hereinafter be abbreviated to IFFT) units 16-1 through 16-Nt, guard interval insertion units 17-1 through 17-Nt, transmitting antennas 18-1 through 18-Nt, and so on.

In the transmitting device, the transmission data are encoded based on a predetermined error correction code (the FEC encoder 10), then compressed (puncturing unit 11) and split into Ns-pieces of data streams by the S/P converting unit 12. The data streams are allocated to subcarrier signals having predetermined frequencies by the frequency interleavers 13-1 through 13-Ns, and the respective constellation mappers 14-1 through 14-Ns modulate the subcarriers signals by a predetermined modulation method on the basis of the data streams allocated to these subcarrier signals.

The modulated subcarrier signals are mapped to the transmitting antennas 18-1 through 18-Nt on the basis of the CSI by the preceding unit 15. Thus, the respective signals mapped to the transmitting antennas are inverse-fast-Fourier-transformed by the IFFT units 16-1 through 16-Nt, then GI insertion units 17-1 through 17-Nt insert the guard intervals in the signals, and these GI-inserted signals are transmitted from the transmitting antennas 18-1 through 18-Nt. Note that the CSI is generated through the channel estimation of the receiving device, and the transmitting device is notified of this generated CSI.

In the MIMO-OFDM wireless communication system using this type of conventional linear precoder, the number of transmission data streams (Ns) is generally required to be less than the number of transmitting antennas (Nt) in order to improve error rate performance. Further, in the transmitting device, it is required for attaining this purpose that the constellation mappers 14-1 through 14-Ns adaptively select the modulation method on the basis of the CSI etc, and that other function units conduct adaptive transmission power control.

Note that the conventional arts related to the present invention of the application are disclosed in the following documents. The conventional art documents are "Japanese Unexamined Patent Application Publication No. 2004-534456", "Japanese Unexamined Patent Application Publication No. 2003-530010", "Japanese Patent Application Laid-Open Publication No. 2004-304760", and "Japanese Patent Application Laid-Open Publication No. 2004-254285."

In the conventional MIMO-OFDM wireless communication system described above, however, if the number of transmitting/receiving antennas increases while actualizing the adaptive modulation and the adaptive transmission power control, circuit configurations of the transmitting device and the receiving device become complicated, a circuit scale expands, and there arise problems such as cost-up and an increase in power consumption.

SUMMARY OF THE INVENTION

It is an object of the present invention to provide a wireless communication system and a receiving device that are capable of restraining the circuit scale and acquiring an excellent error rate performance.

The present invention adopts the following configurations in order to solve the problems described above. Namely, in a wireless communication system in which a transmitting device having a plurality of transmitting antennas and a receiving device having a plurality of receiving antennas perform communications by use of an orthogonal frequency division multiplexing system, the transmitting device comprises a status acquiring unit acquiring a channel matrix generated by previous signals from the receiving device, a partition unit partitioning a transmission data sequence into a plurality of data streams, and a mapping unit mapping the plurality of data streams to the respective transmitting antennas by using, for a preceding matrix, columns, corresponding to a stream count of the plurality of data streams, of a right singular matrix acquired by singular value decomposition of the channel matrix, and the receiving device comprises an estimation unit estimating a present channel status from the received signals and generating a present channel matrix representing the present channel status, and a decoding unit Viterbi-decoding the received signals by weighting a path metric by using a weighting coefficient corresponding to a signal-to-noise ratio obtained from the present channel matrix.

In the transmitting device of the present invention, the transmission data sequence is partitioned into the plurality of data steams, and the plurality of data streams are mapped to the respective transmitting antennas according to the preceding matrix acquired from the channel matrix generated in the receiving device on the basis of the previous transmitted signals and thus transmitted.

In the receiving device, a propagation environment (channel) status between the transmitting device and the receiving device is estimated based on the signals transmitted from the transmitting device, and the present channel matrix is generated. Then, the received signals are Viterbi-decoded by use of the weighting coefficient corresponding to a signal-to-noise ratio obtained from the thus-generated present channel matrix. This Viterbi decoding involves decoding the signals by using the weighting coefficient as a path metric weight.

Thus, the present invention actualizes eigenmode transmission by using, as the precoding matrix, a partial matrix of a right singular matrix obtained by singular value decomposition (SVD) of the channel matrix. Then, in this type of eigenmode transmission, the signal-to-noise ratio is obtained from the channel matrix estimated in the receiving device, and the path metric is weighted by the signal-to-noise ratio using as the weighting coefficient, thereby improving an error rate performance of the Viterbi decoding.

Moreover, the present invention actualizes spatial interleaving and frequency interleaving by orthogonal-frequency-division-multiplexing the plurality of data streams partitioned by the partition unit, being mapped to the plurality of transmitting antennas and being transmitted therefrom.

With this scheme, according to the present invention, also in such a configuration that the number of transmission data streams is equalized to the number of the plurality of transmitting antennas and the transmitting device performs neither adaptive modulation nor power control, an excellent error rate performance can be acquired by the simple signal process in the receiving device. Then, the present invention does not require any circuit components related to the adaptive modulation, the power control etc, and hence a circuit scale of the device itself can be restrained.

It should be noted that the description according to the present invention is that the status acquiring unit in the transmitting device acquires the channel matrix from the receiving device, however, this explicitly shows the acquirement of the propagation environment (channel) information. Further, as in the case of a TDD (Time Division Duplex) communication system, the transmitting device itself may estimate the channel matrix. The propagation environment information may be information on the so-called channel matrix itself and may also be information on the preceding matrix.

Furthermore, the decoding unit in the present invention may use, as the weighting coefficient, eigenvalues obtained by singular value decomposition of the present channel matrix. The eigenvalues connoted herein represent a square value of the singular value obtained by singular value decomposition of the channel matrix.

Thus, by utilizing such a feature that the channel eigenvalues are proportional to the signal-to-noise ratio and the channel eigenmodes have a frequency selective fading characteristic, the channel eigenvalues are regarded as signal reliability and taken in the path metric of the Viterbi decoding.

Therefore, according to the present invention, a combination of the frequency interleaving and the weighted Viterbi algorithm enables the error rate performance to be improved by the simple signal processing in the receiving device.

Further, according to the present invention, the decoding unit may use the weighting coefficient corresponding to a signal-to-noise ratio calculated based on elements of a matrix into which the present channel matrix is multiplied by the precoding matrix acquired by singular value decomposition of the channel matrix generated by the previous signals.

From the feature of the channel eigenmode described above, the channel eigenvalues have the proportional relationship with the thus-calculated signal-to-noise ratio, and it is therefore possible to obtain the same effect as in the case of using the channel eigenvalues as the weighting coefficient.

Moreover, in the wireless communication system according to the present invention, the transmitting device may further comprise a modulating unit determining constellation of respective data symbols with respect to each of the plurality of data streams, and the receiving device may further comprise a detecting unit detecting the constellation of the respective data symbols with respect to such received data streams that the received signals are demultiplexed into the signals corresponding to the stream count of the plurality of data streams.

Further, in the wireless communication system according to the present invention, the transmitting device may further comprise a frequency mapping unit mapping each of the plurality of data streams to subcarrier frequencies of the data symbols, and the receiving device may further comprise an acquiring unit acquiring the data symbol from the subcarrier frequency with respect to each of the received data streams.

Thus, the transmitting device and the receiving device, which configure the wireless communication system according to the present invention, can be configured to be each provided with the modulating unit, the frequency mapping unit, the detecting unit and the acquiring unit with respect to each of the plurality of data streams or each of the received data streams that actualize the spatial interleaving. It is to be noted that the partition unit may, without actualizing the spatial interleaving, partition the transmission bit sequence into the plurality of data streams simply for parallel processing.

Still further, the present invention relates to each of the transmitting device and the receiving device that configure the wireless communication system. The present invention may be a program for actualizing any one of the functions executed by the transmitting device and the receiving device. Yet further, the present invention may also be a readable-by-computer storage medium stored with such a program.

According to the present invention, it is feasible to provide the wireless communication system and the receiving device each capable of restraining a circuit scale and obtaining an excellent error rate performance.

DESCRIPTION OF THE PREFERRED EMBODIMENTS

A MIMO (Multiple Input Multiple Output)-OFDM (Orthogonal Frequency Division Multiplexing) wireless communication system in each of embodiments of the present invention will hereinafter be described with reference to the drawings. It should be noted that configurations in the embodiments, which will hereinafter be described, are exemplifications, and the present invention is not limited to the configurations in the following embodiments.

First Embodiment

The MIMO-OFDM wireless communication system in a first embodiment of the present invention will hereinafter be explained.

System Architecture

Figure 1:
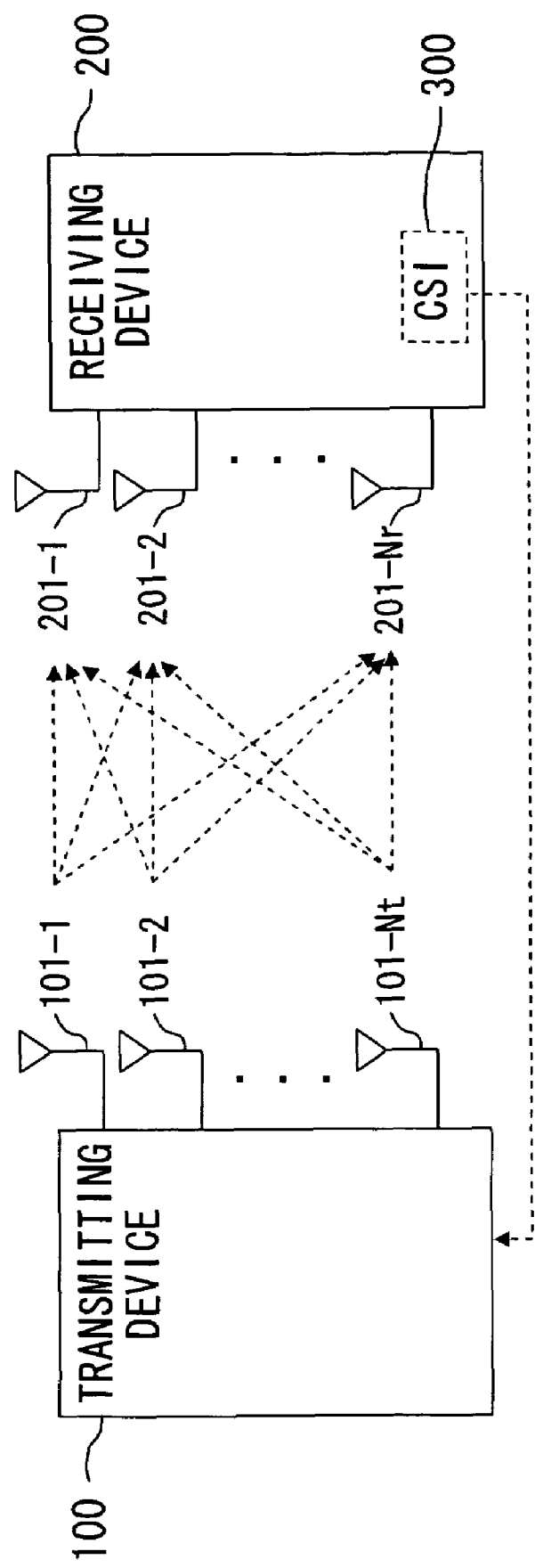
FIG. 1 is a diagram showing a system architecture of a MIMO-OFDM wireless communication system in a first embodiment.

A system architecture of the MIMO-OFDM wireless communication system in the first embodiment will be explained with reference to FIG. 1. FIG. 1 is a diagram showing the system architecture of the MIMO-OFDM wireless communication system in the first embodiment. The MIMO-OFDM wireless communication system in the first embodiment is configured by a transmitting device 100 having Nt-pieces of transmitting antennas 101-1 through 101-Nt, and a receiving device 200 having Nr-pieces of receiving antennas 201-1 through 201-Nr. Thus, a separate configuration into the transmitting device 100 and the receiving device 200 is given in the first embodiment for an explanatory convenience, however, each of the transmitting device 100 and the receiving device 200 may have both of a transmitting function and a receiving function.

The receiving device 200 estimates, based on pilot signals etc contained in signals received respectively by the receiving antennas 201-1 through 201-Nr, a channel characteristic between the transmitting device 100 and the receiving device 200, and generates channel status information (CSI) 300. The thus-generated CSI 300 is fed back to the transmitting device 100. The present invention limits neither this CSI generating method nor a CSI feedback method.

Transmitting Device

Figure 2:
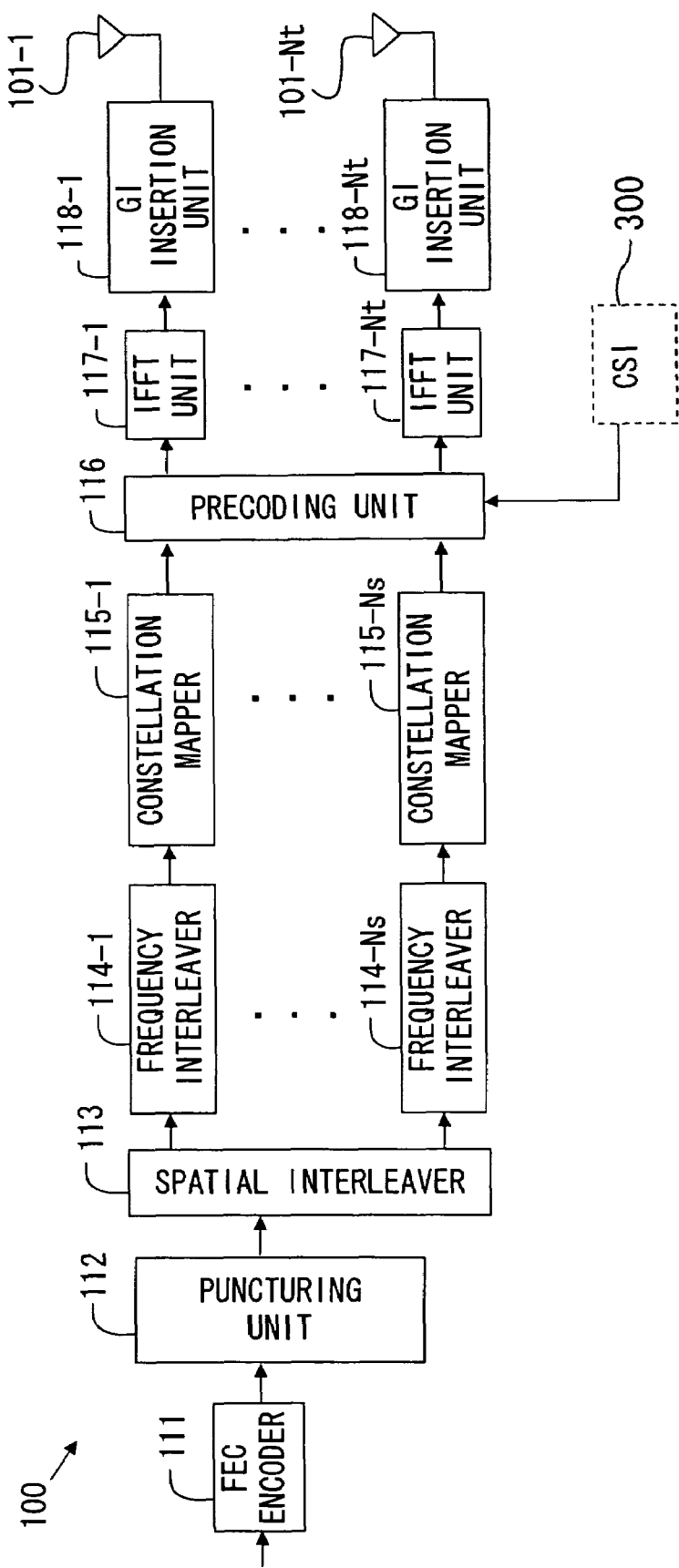
FIG. 2 is a diagram showing an example of a circuit configuration of a transmitting device in the first embodiment.

An example of a circuit configuration of the transmitting device 100 will hereinafter be explained with reference to FIG. 2. FIG. 2 is a block diagram showing the example of the circuit configuration of the transmitting device 100 in the first embodiment.

The transmitting device 100 includes, as shown in FIG. 2, transmitting antennas 101-1 through 101-Nt, an FEC encoder 111, a puncturing unit 112, a spatial interleaver 113, frequency interleavers 114-1 through 114-Ns, constellation mappers 115-1 through 115-Ns, a preceding unit 116, IFFT units 117-1 through 117-Nt, GI (Guard Interval) insertion units 118-1 through 118-Nt, etc.

The FEC encoder 111 encodes transmission bit sequences into convolutional codes having a predetermined coding rate etc. The present invention, since a decoding process in the receiving device 200 involves using Viterbi algorithm, does not limit a encoding method, the coding rate, etc of the FEC encoder 111 if capable of Viterbi decoding. The bit sequences encoded by the FEC encoder 111 are inputted to the puncturing unit 112.

The puncturing unit 112 executes puncturing of the encoded bit sequences received from the FEC encoder 111. The punctured bit sequences are inputted to the spatial interleaver 113.

The spatial interleaver 113 partitions the bit sequences received from the puncturing unit 112 to Ns-pieces of data streams. To be specific, the spatial interleaver 113 periodically sends the bit sequences to the respective data streams with a preset block size s (bits). For example, a value given as below is set in this block size s. In the following example, $N_{BPSC}$ represents the number of coded bits per symbol in each subcarrier. Namely, $N_{BPSC}=1$ if the constellation is BPSK (Binary Phase Shift Keying), $N_{BPSC}=2$ if the constellation is QPSK (Quadrature Phase Shift Keying), $N_{BPSC}=4$ if the constellation is 16QAM (Quadrature Amplitude Modulation), and $N_{BPSC}=6$ if the constellation method is 64QAM.

$s=1,$ (Example 1)

$s=\max(N_{BPSC}/2, 1)$ (Example 2)

$s=N_{BPSC}$ (Example 3)

In these examples, the block size s is defined as (Example 2), and 16QAM is adopted as the constellation of each subcarrier, in which case it follows that the spatial interleaver 113 sends the bit sequences on a 2-bit-by-2-bit basis to the respective data streams. Thus, the bit sequences are partitioned and thus sent by the spatial interleaver 113 to the respective data streams, and hence it follows that an error rate performance in the Viterbi decoding in the receiving device 200 is improved. Note that the number of data streams (Ns) is set equal to or less than the smaller of the number of transmitting antennas (Nt) and the number of receiving antennas (Nr) (Ns≦min (Nt, Nr)).

Provided are the frequency interleavers 114-1 through 114-Ns and the constellation mappers 115-1 through 115-Ns, of which the numbers each correspond to the number of data streams (Ns), wherein these interleavers and the mappers execute predetermined processes with respect to the individual data streams. The respective frequency interleavers 114-1 through 114-Ns interleave the data streams to the subcarrier signals having predetermined frequencies. The constellation mappers 115-1 through 115-Ns modulate the individual subcarrier signals by the predetermined constellations (BPSK, QPSK, 16QAM, etc) on the basis of the data streams allocated thereto. In the following discussion, the modulated subcarrier signals are also referred to as the transmission data streams. It should be noted that the first embodiment has no execution of the adaptive module, and therefore the respective constellations given above involve fixedly using the predetermined constellations.

The preceding unit 116, when receiving the Ns-pieces of transmission data streams sent from the constellation mappers 115-1 through 115-Ns, maps the Ns-pieces of transmission data streams to the Nt-pieces of transmitting antennas 101-1 through 101-Nt. The preceding unit 116 executes the mapping process by using a precoding matrix F(k) based on CSI 300 that is fed back from the receiving device 200. This mapping process is shown in the following formula (1). In the formula (1), s(k) designates a transmission data vector (the transmission data stream) of a (Ns-rows×1-column) matrix, and x(k) represents a transmission antenna data vector of a (Nt-rows×1-column) matrix that is defined as the signal mapped to each of the transmitting antennas.

$$x(k)=F(k)s(k) \hspace{2cm} \text{Formula (1)}$$

Note that the precoding matrix F(k) is the first Ns-column of right singular matrix V(k) obtained by Singular Value Decomposition (SVD) of a channel matrix H(k) based on the CSI, and can be expressed as in the following formula (2). Further, the SVD of the channel matrix H(k) having the Nr-rows and the Nt-columns with respect to the subcarrier k can be expressed as in the following formula (3). In the following formula (3), U(k) represents a left singular matrix having the Nr-rows and the Nr-columns, V(k) is a right singular matrix having the Nt-rows and the Nt-columns, and D(k) is a diagonal matrix having the Nr-rows and the Nt-columns. The symbol m denotes a rank of the channel matrix H(k), a suffix letter $^H$ represents a complex conjugate transposition. Then, the diagonal matrix D(k) acquired by the SVD can be expressed as in the following formula (4), where this diagonal element shall be represented as a singular value, and a value, into which this singular value is squared, shall be represented as eigenvalues ($\lambda_m(k)$).

Thus, the right singular matrix V(k) acquired by the SVD of the channel matrix H(k) is utilized as the precoding matrix F (k), whereby the MIMO channel can be deemed to be m-pieces of eigen-paths having performance corresponding to a magnitude of the eigenvalues $\lambda_m(k)$. Note that the eigenvalues of the MIMO channel are proportional to a signal-to-noise ratio (SNR), and eigen-mode transmission of the MIMO channel has a frequency selective fading property.

Moreover, the CSI 300 of which the receiving device 200 notifies may be information on the channel matrix H(k) and may also be information on the preceding matrix F (k) given above. The present invention does not limit the CSI 300.

$$F(k)=V_{1:Ns}(k) \hspace{2cm} \text{Formula (2)}$$

$$H(k)=U(k)D(k)V^H(k) \hspace{2cm} \text{Formula (3)}$$

$$D(k)=\text{diag}(\sqrt{\lambda_1(k)}, \sqrt{\lambda_2(k)}, \ldots, \sqrt{\lambda_m(k)}, 0, \ldots, 0) \hspace{1cm} \text{Formula (4)}$$

As expressed in the formula (1) given above, the signals mapped to the respective transmitting antennas are transmitted to the IFFT units.

Provided are the IFFT units 117-1 through 117-Nt and the GI insertion units 118-1 through 118-Nt, of which the numbers each correspond to the number of the transmitting antennas 101-1 through 101-Nt (Nt), wherein these units execute predetermined processes upon the signals mapped to the respective antennas. The respective IFFT units 117-1 through 117-Nt perform the inverse fast Fourier transform (IFFT) or inverse discrete Fourier transform (IDFT) with respect to the signals mapped to the respective transmitting antennas, thereby transforming the frequency domain signals into time domain signals. The thus-transformed time domain signals are transferred to the GI insertion units 118-1 through 118-Nt, respectively.

The individual GI insertion units 118-1 through 118-Nt insert guard intervals in the respective time domain signals in order to reduce inter symbol interference (ISI). The signals into which the guard intervals have been inserted are transmitted from the respective transmitting antennas 101-1 through 101-Nt.

Receiving Device

Figure 3:
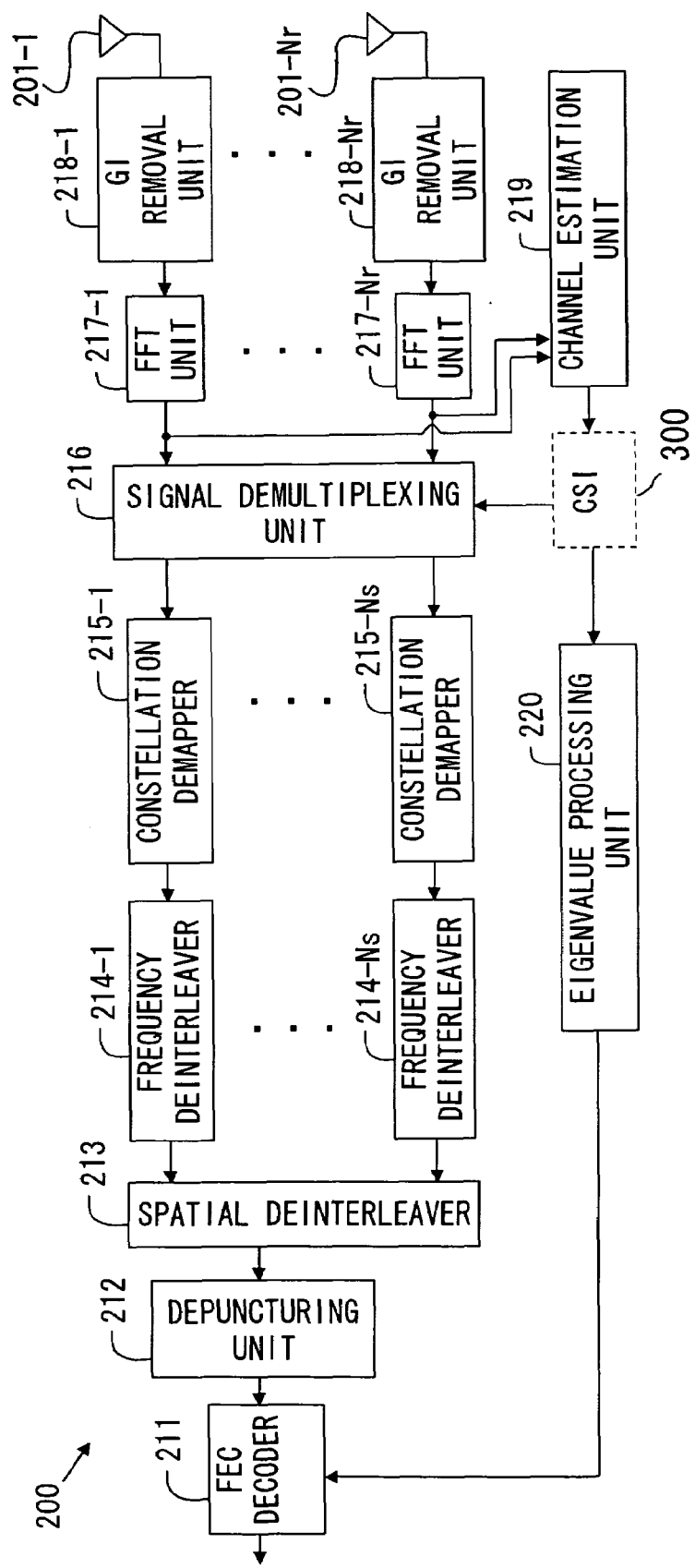
FIG. 3 is a diagram showing an example of a circuit configuration of a receiving device in the first embodiment.

An example of the circuit configuration of the receiving device 200 will hereinafter be described with reference to FIG. 3. FIG. 3 is a block diagram showing the example of the circuit configuration of the receiving device 200 in the first embodiment.

The receiving device 200 includes, as shown in FIG. 3, receiving antennas 201-1 through 201-Nr, an FEC decoder 211, a depuncturing unit 212, a spatial deinterleaver 213, a frequency deinterleavers 214-1 through 214-Ns, constellation demappers 215-1 through 215-Ns, a signal demultiplexing unit 216, fast Fourier transform (which will hereinafter be abbreviated to FFT) units 217-1 through 217-Nr, GI removal units 218-1 through 218-Nr, a channel estimation unit 219, an eigenvalue processing unit 220, etc.

Provided are the GI removal units 218-1 through 218-Nr and the FFT units 217-1 through 217-Nr, of which the numbers each correspond to the number of the receiving antennas (Nr), wherein these units execute predetermined processes with respect to the signals received by the respective receiving antennas 201-1 through 201-Nr. The respective GI removal units 218-1 through 218-Nr remove the GIs out of the received signals. The received signals with the GIs removed therefrom are transmitted to the individual FFT units 217-1 through 217-Nr.

The FFT units 217-1 through 217-Nr transform the time domain signals into the frequency domain signals by fast-Fourier-transforming (FFT) or discrete-Fourier-transforming (DFT) the received signals from which the GIs have been removed. This frequency domain signals y(k) can be expressed as in the following formula (5). In the formula (5), n(k) designates a noise vector having Nr-rows and 1-column, y(k) represents a received signal vector having Nr-rows and 1-column, and the channel matrix H(k) is a matrix showing the channel characteristic at the received time. The signals received by the respective receiving antennas become those overlapped with the signals transmitted from the transmitting antennas.

$$y(k)=H(k)F(k)s(k)+n(k) \qquad \text{Formula (5)}$$

The transformed frequency domain signals y(k) are each transferred to the signal demultiplexing unit 216 and to the channel estimation unit 219.

The channel estimation unit 219 estimates the channel characteristic in each receiving antenna on the basis of each of the frequency domain signals. The present invention does not restrict this channel estimation method. The channel estimation unit 219 generates the channel matrix H(k) by a predetermined estimation process. The channel matrix H(k) is sent as the CSI 300 to the signal demultiplexing unit 216 and the eigenvalue processing unit 220. This CSI 300 may be information on the channel matrix H(k) and may also be information on the precoding matrix F(k).

The eigenvalue processing unit 220 computes the SVD of the channel matrix H(k) received from the channel estimation unit 219 (refer to the Formula (3) given above) and calculates a square of the singular value as the diagonal element of the obtained matrix D(k) (refer to the formula (4)). Each of the calculated eigenvalues are associated with each data stream i and sent to the FEC decoder 211.

The signal demultiplexing unit 216, when receiving respectively the frequency domain signals y(k) corresponding to the receiving antennas 201-1 through 201-Nr, demultiplexes these signals y(k) into Ns-pieces of signals (data stream) by zero forcing (which will hereinafter be abbreviated to ZF) linear decoding, or minimum mean square error (which will hereinafter be abbreviated to MMSE) decoding. The present invention does not limit these signal demultiplexing (signal equalization) methods.

In the case of performing the ZF linear decoding, a matrix G(k) having Ns-rows and Nr-columns shown in the following formula (6) is multiplied by the received signal vector y(k). In the formula (6), the suffix letter $^+$ represents a pseudo inverse matrix.

$$G(k)=[H(k)F(k)]^+ \qquad \text{Formula (6)}$$

On the other hand, in the case of performing the MMSE decoding, the matrix G(k) having Ns-rows and Nr-columns shown in the following formula (7) is multiplied by the received signal vector y(k). In the following formula (7), $N_0$ represents noise power, $\epsilon_S$ designates total transmission power, and I represents a identity matrix.

$$G(k) = \left[F^H(k)H^H(k)H(k)F(k) + \left(Ns \cdot \frac{N_0}{\varepsilon_s}\right)I_{Ns}\right]^{-1} F^H(k)H^H(k) \qquad \text{Formula (7)}$$

Note that the channel matrix H(k) used for obtaining the matrix G(k) is the propagation path characteristic matrix estimated when the present received signal y(k) has been propagated, and F(k) is a matrix (which is used as the precoding matrix in the transmitting device 100) deduced from the channel matrix of which the transmitting device 100 has already been notified. Namely, the signal demultiplexing unit 216 retains the channel matrix generated from the channel estimation made last time and also the matrix deduced from the channel matrix of which the transmitting device has already been notified, and utilizes these matrices for demultiplexing the signals next time. This is because the transmitting device 100 conducts the linear preceding by use of the preceding matrix based on the CSI fed back by the receiving device 200. Ns-pieces of demultiplexed signals are transmitted to the respective constellation demappers 215-1 through 215-Ns.

Provided are the frequency deinterleavers 214-1 through 214-Ns and the constellation demappers 215-1 through 215-Ns, of which the numbers each correspond to the number of to-be-demultiplexed signals (data streams) (Ns), wherein the deinterleavers and the demappers execute predetermined processes with respect to the individual signals (data streams). The constellation demappers 215-1 through 215-Ns demodulate the respective signals (data streams) by the constellation used in the transmitting device 100 as shown in the following formula (8). In the following formula (8), sˆ(k) represents the recovered estimation data stream, and Q[ ] indicates the demapper. The respective estimation data streams sˆ(k) are sent to the frequency deinterleavers 214-1 through 214-Ns.

$$sˆ(k)=Q[G(k)y(k)] \qquad \text{Formula (8)}$$

The respective frequency deinterleavers 214-1 through 214-Ns perform frequency-deinterleaving of the estimation data streams. The frequency-deinterleaved estimation data streams are each sent to the spatial deinterleaver 213.

The spatial deinterleaver 213 aggregates the estimation data streams into one estimation bit sequence. At this time, the spatial deinterleaver 213 aggregates the respective estimation data streams on a block size s (bits) basis that is employed by the spatial interleaver 113 of the transmitting device 100. Namely, the spatial deinterleaver 213 makes a rearrangement so as to recover the bit sequence distributed by the spatial interleaver 113 to the original status. An estimation bit sequence is transmitted to the depuncturing unit 212.

The depuncturing unit 212 executes a depuncturing process of the estimation bit sequence, and transfers the thus-obtained estimation bit sequence to the FEC decoder 211.

The FEC decoder 211 decodes the inputted estimation bit sequence (which is a soft-decided estimation value) by use of the Viterbi algorithm. The decode using the Viterbi algorithm involves, for example, comparing, with respect to each path, a sum of an inter-signal distance (a branch metric) between the bit sequence acquirable at each point of time on a trellis diagram and a receiving bit sequence and a path metric up to each status at a previous point of time, in accordance with the trellis diagram corresponding to a status transition of each data bit in terms of generating a convolutional code in the FEC encoder 111 of the transmitting device 100, then selecting the smaller of the path metrics as a survival path and decoding by finally tracing back the survival path.

The FEC decoder 211 employs, as shown in the following formula (9), a squared Euclidian distance as the branch metric between the estimation bit sequence and a reference value, and computes a path metric $p_{i,n}(k)$ as a value obtained in a way that weights the squared Euclidian distance with channel eigenvalues $\lambda_i(k)$ transferred from the eigenvalue processing unit 220. The FEC decoder 211 decodes the estimation bit sequence received in each subcarrier k by employing the channel eigenvalue corresponding to this subcarrier. In the following formula (9), the symbol i represents a data stream number, n designates a bit index, bˆ represents each piece of bit data of the estimation bit sequence, and b designates a reference bit value. The bit index n has a range corresponding to the number of coded bits per symbol based on the constellation. When the constellation is, e.g., 16QAM, the bit index n takes a value ranging from 1 up to 4.

$$p_{i,n}(k) = \lambda_i(k)|\hat{b}_{i,n}(k) - b_{i,n}(k)^2|$$ Formula (9)

Operation/Effect in First Embodiment

Herein, operations and effects of the MIMO-OFDM wireless communication system in the first embodiment discussed above will be stated with respect to each of the transmitting device 100 and the receiving device 200.

In the transmitting device 100, the transmission bit sequence is encoded by the FEC encoder 111 in a way that uses the convolutional code etc and is, after being punctured by the puncturing unit 112, split by the spatial interleaver 113 into Ns-pieces of data streams. The thus-split data streams are allocated to the predetermined subcarrier signals by the respective frequency interleavers 114-1 through 114-Ns provided corresponding to the data streams, and are mapped respectively to the subcarrier signals (transmission data streams) by the constellation mappers 115-1 through 115-Ns on the basis of the fixed predetermined constellation.

Thus, in the first embodiment, the transmission bit sequence is split into the data streams according the predetermined blocks, and the data streams are transmitted by the individual subcarriers, thus actualizing the spatial interleaving and the frequency interleaving.

Subsequently, the Ns-pieces of transmission data streams corresponding to the data streams are mapped to the Nt-pieces of transmitting antennas 101-1 through 101-Nt by the preceding unit 116. The preceding unit 116 executes the mapping process to the respective transmitting antennas with the precoding matrix F(k) for Ns-columns of the right singular value matrix V(k) acquired by the SVD of the channel matrix H(k) based on the CSI sent from the receiving device 200.

Figure 4:
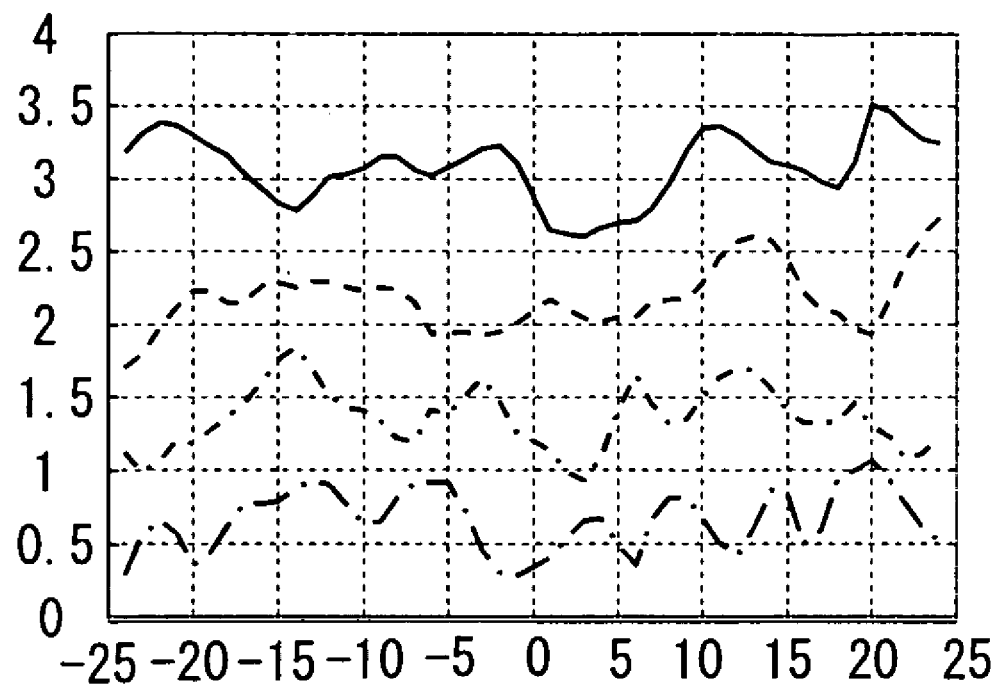
FIG. 4 is a diagram showing an example of a channel eigenvalues.

With this process, in the MIMO-OFDM wireless communication system in the first embodiment, the MIMO channels in the subcarriers can be deemed as m-pieces of eigen-paths each having performance corresponding to the magnitude of the eigenvalues $\lambda_m(k)$ (see FIG. 4). Then, the receiving device in the first embodiment takes the configuration capable of acquiring the excellent error characteristic by utilizing such a feature (see FIG. 4) that the channel eigenvalues are proportional to the SNR, and the channel eigen-mode transmission has the frequency selective fading characteristic. FIG. 4 is a graph showing an example of the channel eigenvalues and exemplifying a case in which the number of the transmitting antennas is 4, and the number of the receiving antennas is 4.

The signals mapped to the respective transmitting antennas are inverse-fast-Fourier-transformed (IFFT) or inverse-discrete-Fourier-transformed (IDFT) into the time domain signals from the frequency domain signals by the individual IFFT units 117-1 through 117-Nt provided corresponding to the transmitting antennas, further the GI insertion units 118-1 through 118-Nt insert the guard intervals (GIs) in the transformed signals, and thereafter the signals are transmitted respectively from the transmitting antennas.

In the receiving device 200, the GI removal units 218-1 through 218-Nr provided corresponding to the receiving antennas remove the guard intervals out of the signals received by the receiving antennas 201-1 through 201-Nr, and further the FFT units 217-1 through 217-Nr convert the signals into the frequency domain signals by using FFT or DFT.

The channel estimating unit 219 estimates the channel matrix H(k) acting on each of the signals on the basis of the signals converted into the frequency domain signals. The eigenvalue processing unit 220 computes the SVD of this estimated channel matrix H(k) and squares the singular value as the diagonal element of the acquired diagonal matrix D(k), thereby calculating the eigenvalues. Each of the calculated eigenvalues are associated with each subcarrier and with each data stream i and is thus sent to the FEC decoder 211.

The signal demultiplexing unit 216 demultiplexes the frequency domain signals corresponding to the respective receiving antennas into the Ns-pieces of data streams on the basis of the channel matrix H(k) transferred from the channel estimation unit 219 and the precoding matrix F(k) obtained from the channel matrix of which the transmitting device 100 has already been notified.

The constellation demappers 215-1 through 215-Ns provided corresponding to the respective data streams demap the Ns-pieces of data streams by use of the fixed predetermined constellation, and the frequency deinterleavers 214-1 through 214-Ns deinterleaves the demapped data streams. The frequency-deinterleaved estimation data streams are rearranged into one estimation bit sequence by the spatial deinterleaver 213 and are, after being depunctured by the depuncturing unit 212, sent to the FEC decoder 211.

The FEC decoder 211 performs Viterbi-decoding by use of the path metric $P_{i,n}(k)$ obtained by weighting the squared Euclidian distance between the estimation bit sequence and the reference value with the channel eigenvalues $\lambda_i(k)$ received from the eigenvalue processing unit 220.

Thus, in the first embodiment, the channel eigenvalues are taken into the path metric of the Viterbi decoding as the signal reliability by utilizing the feature that the channel eigenvalues described above are proportional to the SNR, and the channel eigen-mode transmission has the frequency selective fading characteristic.

With this operation, according to the first embodiment, the combination of the frequency interleaving with the weighted Viterbi decode enables the acquirement of the excellent error rate performance without conducting the adaptive modulation and the adaptive transmission power control. Accordingly, the transmitting device 100 and the receiving device 200 in the first embodiment do not require the circuit performing the adaptive modulation and the adaptive transmission power control, thereby making it possible to restrain the circuit from becoming complicated and to downsize the circuit scale. Further, the spatial interleaving is employed, and hence, even when the number of data streams (Ns) is equalized to the number of the transmitting antennas (Nt), the excellent error rate performance can be acquired.

Figure 5:
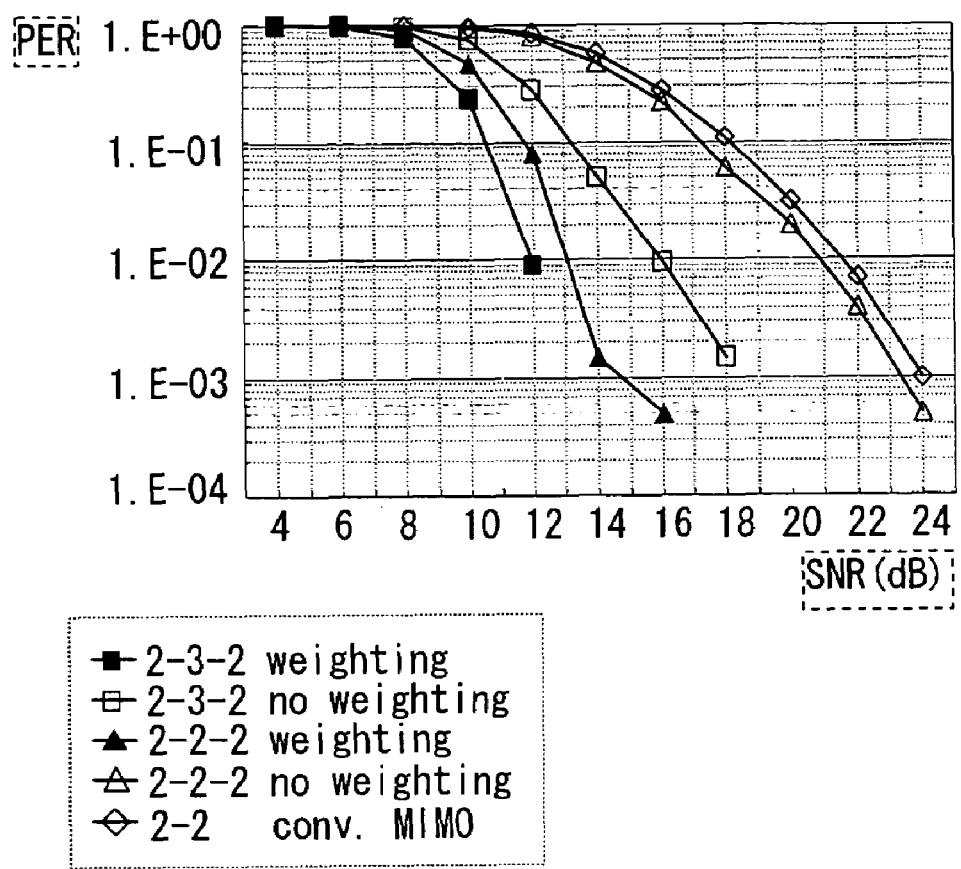
FIG. 5 is a diagram showing a simulation result related to the MIMO-OFDM wireless communication system in the first embodiment.

FIG. 5 is a graph showing a result of simulation related to the MIMO-OFDM wireless communication system in the first embodiment. In FIG. 5, the axis of abscissa represents the SNR, and the axis of ordinate represents a packet error rate (PER). This simulation involves employing, as shown in explanatory notes in FIG. 5, five system models that will be given as below. The system models such as [2-3-2 weighting] and [2-2-2 weighting] are used as those corresponding to the first embodiment discussed above, while the system models such as [2-3-2 no weighting] and [2-2-2 no weighting] are used as those corresponding to the prior art related thereto, and the system model [2-2 conv.MIMO] is used as the model of the MIMO system that does not employ the linear precoding in the prior art. Among these system models, the numerals such as [2-3-2] represent the number of data streams (Ns) (=2), the number of the transmitting antennas (Nt) (=3) and the number of the receiving antennas (Nr) (=2) that are provided in the system model concerned, [weighting] indicates a case of using a weighting coefficient, and [no weighting] represents a case of using none of the weighting coefficient.

The simulation results in FIG. 5 show that [2-2-2 weighting] can have more of SNR improvement by approximately 9 decibel (dB) than [2-2-2 no weighting] between [2-2-2 weighting] and [2-2-2 no weighting]. Similarly, it is shown also in the [2-3-2] system that the system model using the weighting coefficient according to the first embodiment has more of SNR improvement by approximately 4 dB than the system model using none of the weighting coefficient according to the prior art.

Modified Example

In the receiving device in the MIMO-OFDM wireless communication system in the first embodiment discussed above, the FEC decoder 211 performs the Viterbi decoding by utilizing, as the weighting coefficient, the channel eigenvalues corresponding to the subcarrier k with respect to the estimation bit sequence received by each subcarrier k, however, in place of this channel eigenvalues, the SNR of the valid channel may also be used as the weighting coefficient.

Figure 6:
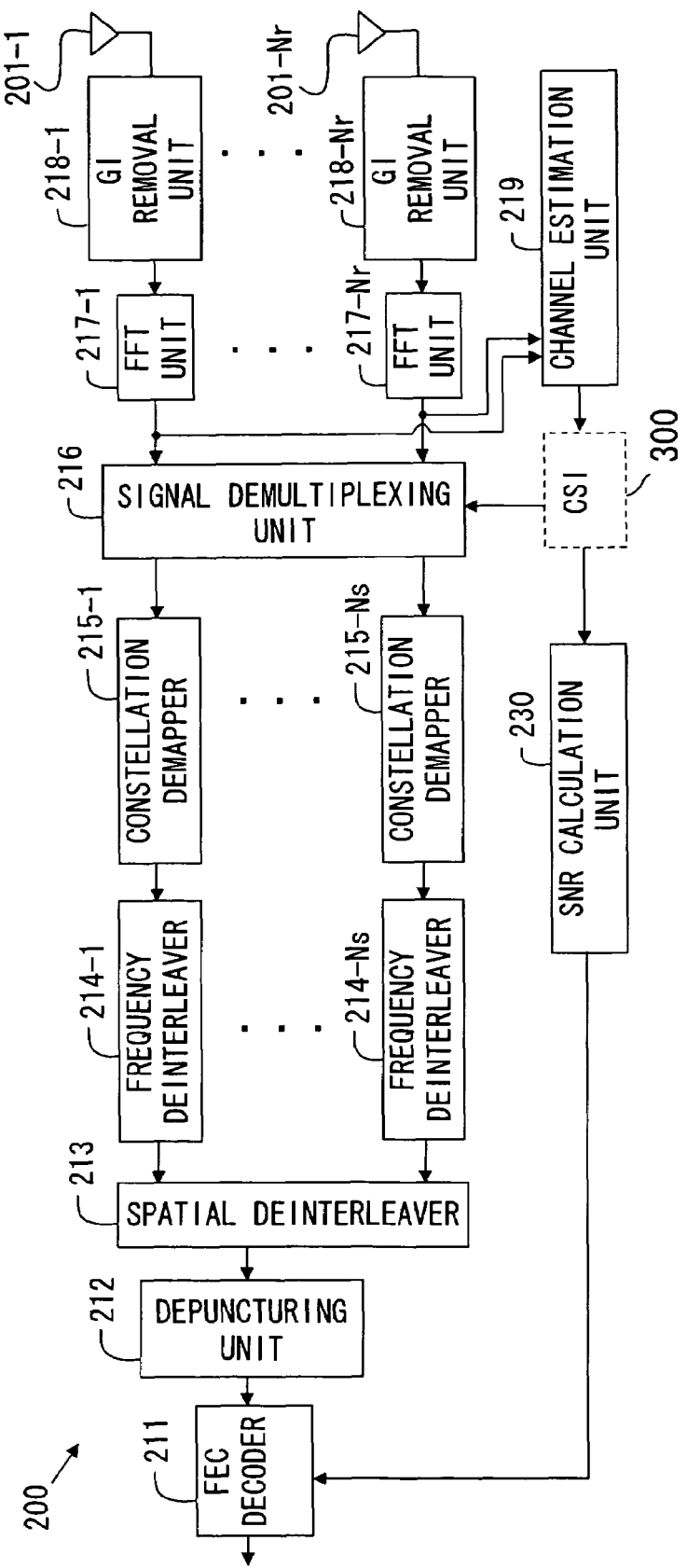
FIG. 6 is a diagram showing a modified example of the receiving device in the first embodiment.

FIG. 6 is a diagram showing a circuit configuration in the modified example of the receiving device in the first embodiment. As illustrated in FIG. 6, the receiving device in the modified example includes an SNR calculation unit 230 as a substitute for the eigenvalue processing unit 220 of the receiving device in the first embodiment. The function units other than this unit are the same as those in the first embodiment, and therefore their explanations are omitted.

The SNR calculation unit 230 sets H(k)×F(k) shown in the formula (5) given above as a valid channel He(k) and calculates, as shown in the following formula (10), an SNR value corresponding to each data stream from an element component of the valid channel He(k). In the following formula (10), $h_{ji}(k)$ represents the element component of j-rows and i-columns of the valid channel He(k) in the subcarrier k, and i corresponds to a data stream number. The calculated SNR value is associated with the subcarrier index and with the data stream number, and is thus transferred to the FEC decoder 211.

$$SNR_i(k) = \sum_{j=1}^{Nr} h_{ji}(k)$$ Formula (10)

The FEC decoder 211, as shown in the following formula (11), makes a change to the channel eigenvalues in the first embodiment, and calculates the path metric by utilizing the SNR value as the weighting coefficient.

[Mathematical Expression 9]

$$p_{i,n}(k) = SNR_i(k)|b\hat{}_{i,n}(k) - b_{i,n}(k)|^2$$ Formula (11)

Respective embodiments that will be exemplified as below are modified examples of the circuit configuration in relation to the MIMO-OFDM wireless communication system according to the first embodiment explained earlier. Accordingly, the MIMO-OFDM wireless communication systems illustrated as follows and the MIMO-OFDM wireless communication system in the first embodiment remain unchanged in their essential functions. The discussions of the respective embodiments that will hereinafter be described shall focus on only differences from the system in the first embodiment, and the explanations of the same function units as those in the first embodiment are omitted.

Second Embodiment

The MIMO-OFDM wireless communication system according to a second embodiment of the present invention will hereinafter be described.

Transmitting Device

Figure 7:
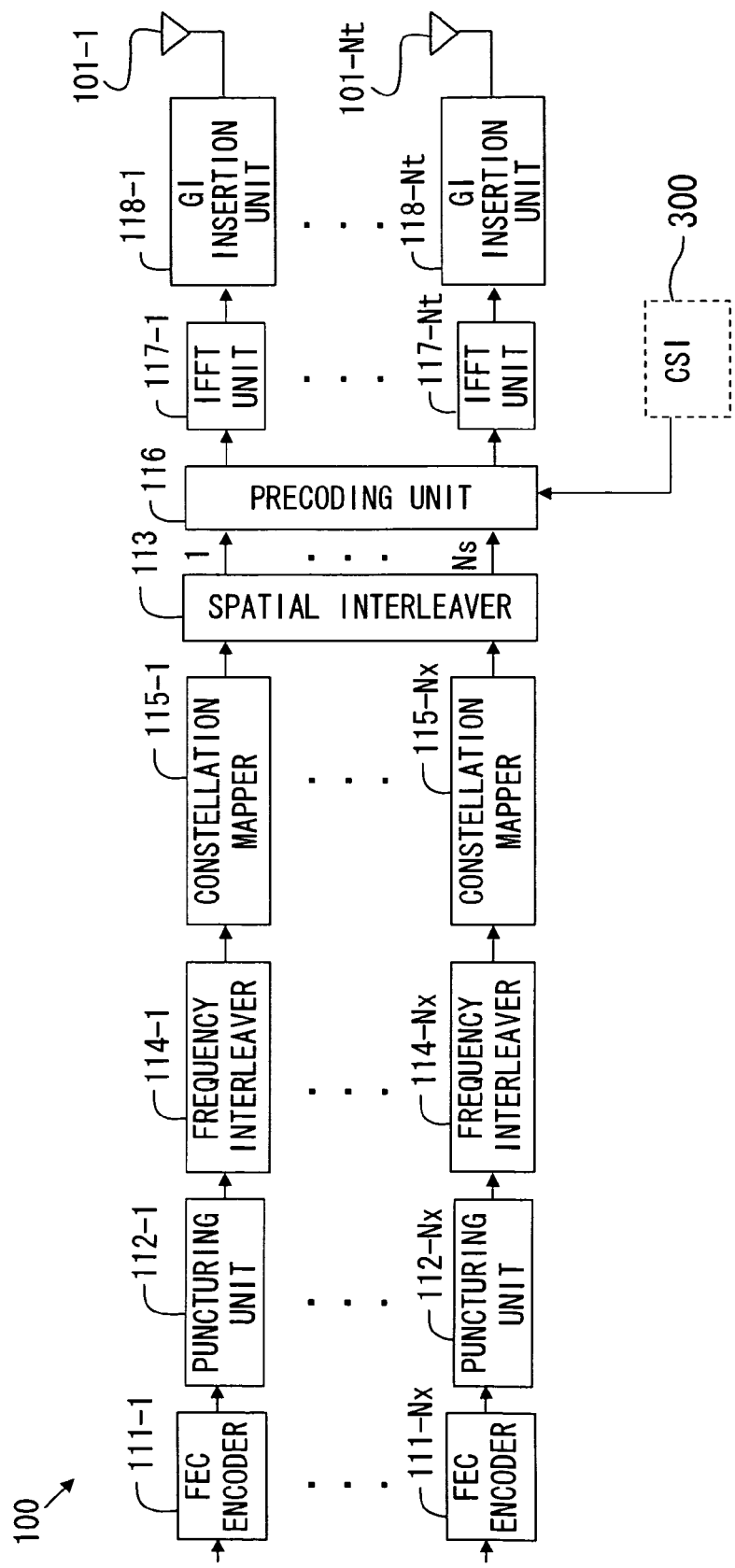
FIG. 7 is a diagram showing an example of a circuit configuration of the transmitting device in a second embodiment.

An example of the circuit configuration of the transmitting device 100 in the second embodiment will hereinafter be explained with reference to FIG. 7. FIG. 7 is a block diagram showing an example of the circuit configuration of the transmitting device 100 in the second embodiment.

The transmitting device 100 in the second embodiment is configured so that the output from the spatial interleaver 113 is, as shown in FIG. 7, inputted to the preceding unit 116, and there are provided other components such as the FEC encoders 111-1 through 111-Nx, the puncturing units 112-1 through 112-Nx, the frequency interleavers 114-1 through 114-Nx and the constellation mappers 115-1 through 115-Nx, of which the numbers each correspond to a parallel process count Nx. Note that this parallel process count Nx may be the same as the number of data streams (Ns) that is the splitting count by the spatial interleaver 113 and may also be a different count.

With this configuration, the transmission bit sequence is split by the parallel process count Nx, and the respective function units execute in parallel the same encoding process, puncturing process, frequency interleaving process and constellation mapping process as those in the first embodiment. At this time, each transmission data sequence after the constellation mapping process is, unlike the data streams partitioned by the spatial interleaver 113, split so as to have a predetermined consecutive data sequence (see FIG. 8 that will be shown as below).

Figure 8:
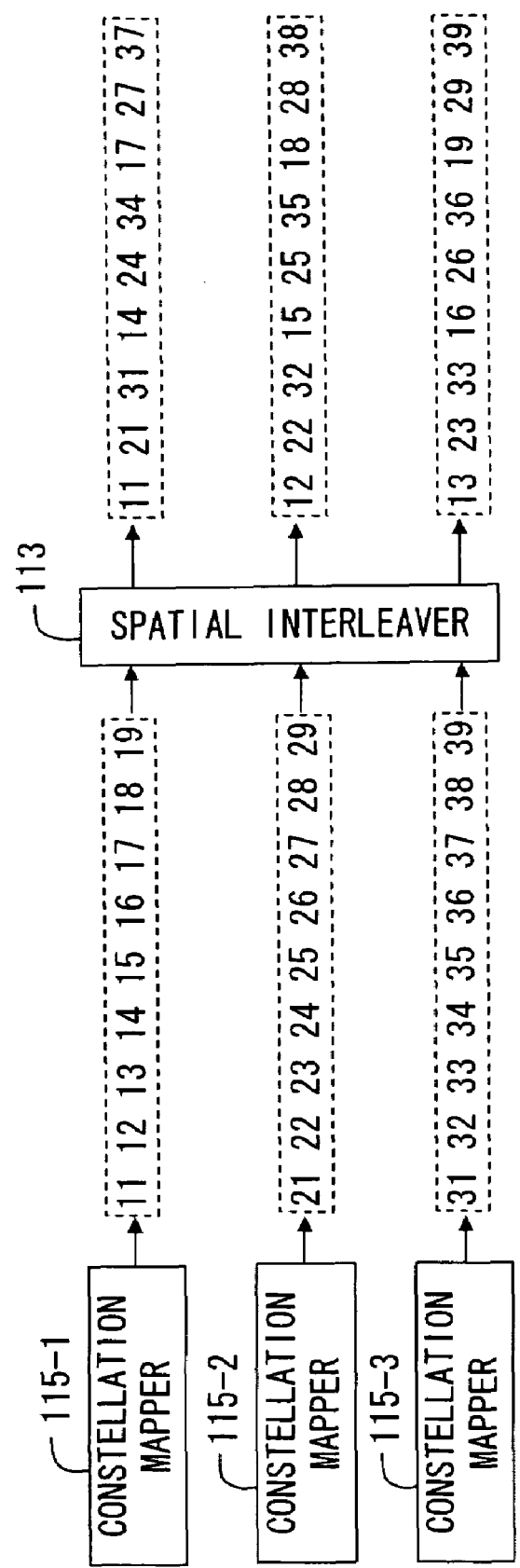
FIG. 8 is a diagram showing an example of spatial interleaving in the second embodiment.

The spatial interleaver 113, upon receiving the signals (transmission data streams) modulated by the predetermined constellation from the constellation mappers 115-1 through 115-Nx, partitions the signals into the plurality of data streams as shown in the example in FIG. 8 so as to actualize the spatial interleaving.

FIG. 8 is a diagram showing an example of the spatial interleaving in the second embodiment. The numerals inputted to from the spatial interleaver 113 or outputted from the spatial interleaver 113 shown in FIG. 8 represent data indexes, respectively. In the example in FIG. 8, the respective data sequences processed in parallel by three pieces of constellation mappers 115-1 through 115-3 are inputted to the spatial interleaver 113, and the spatial interleaver 113 rearranges the data sequences, thus partitioning into the respective data streams.

Receiving Device

Figure 9:
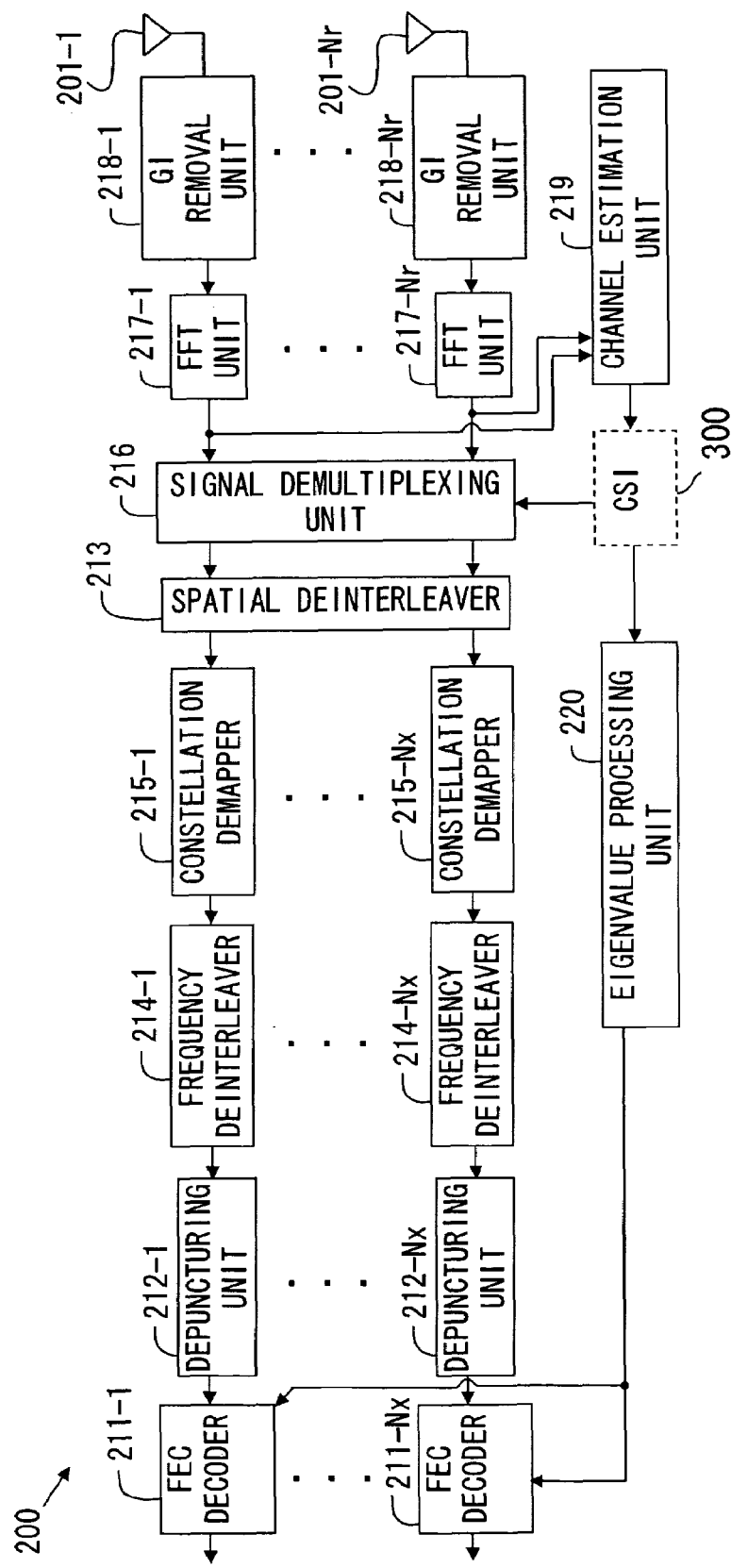
FIG. 9 is a diagram showing an example of the circuit configuration of the receiving device in the second embodiment.

An example of the circuit configuration of the receiving device 200 in the second embodiment will hereinafter be described with reference to FIG. 9. FIG. 9 is a block diagram showing the example of the circuit configuration of the receiving device 200 in the second embodiment.

In the receiving device 200 in the second embodiment, as shown in FIG. 9, the individual function units are formed so as to be adapted to the configuration of the transmitting device 100 described above, wherein the Ns-pieces of signals (data streams) demultiplexed by the signal demultiplexing unit 216 are inputted to the spatial deinterleaver 213, and there are provided other components such as the constellation demappers 215-1 through 215-Nx, the frequency deinterleavers 214-1 through 214-Nx, the depuncturing units 212-1 through 212-Nx and the FEC decoders 211-1 through 211-Nx, of which the numbers each correspond to the parallel process count Nx. Note that this parallel process count Nx may be the same as the number of data streams (Ns) that is the splitting count by the spatial interleaver 113 and may also be a different count.

With this configuration, the Ns-pieces of data streams demultiplexed by the signal demultiplexing unit 216 are inputted to the spatial deinterleaver 213, wherein the order rearranged by the spatial interleaver 113 is returned to the original data order. Thereafter, in the same way as by the transmitting device 100, the transmission bit sequence is partitioned into the data streams by the predetermined parallel process count Nx, and the respective function units execute in parallel the same constellation demapping process, frequency deinterleaving process, depuncturing process and Viterbi decoding process as those in the first embodiment. The eigenvalues calculated by the eigenvalue processing unit 220 are transmitted to the FEC decoders 211-1 through 211-Nx, wherein these values are processed in parallel.

According to the second embodiment, in the transmitting device, the FEC encoder, the puncturing unit, the frequency interleaver and the constellation mapper can be made to execute the parallel processing, while in the receiving device, the constellation demapper, the frequency deinterleaver, the depuncturing unit and the FEC decoder can be made to execute the parallel processing, thereby making it possible to execute the high-speed signal processing without enhancing the performance of each of the function units.

Third Embodiment

The MIMO-OFDM wireless communication system according to a third embodiment of the present invention will hereinafter be described.

Transmitting Device

Figure 10:
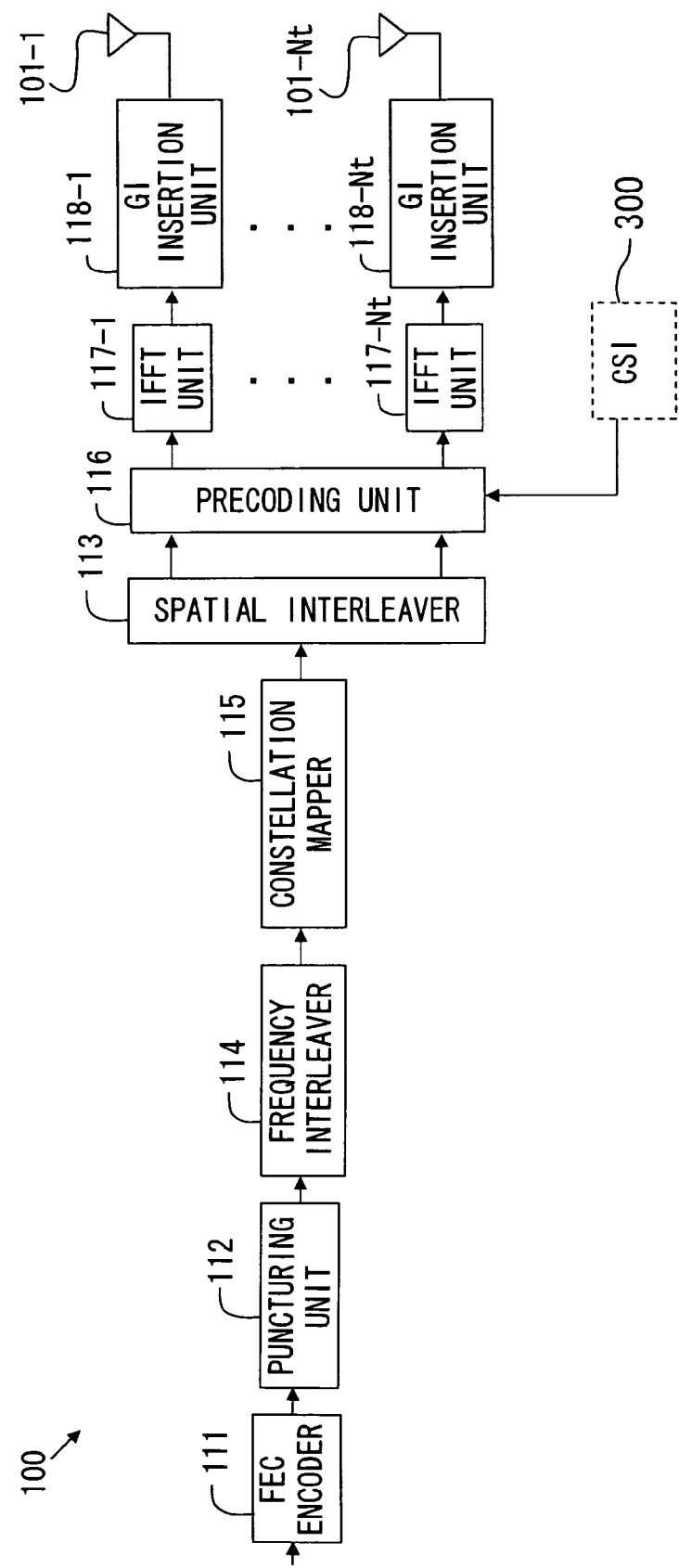
FIG. 10 is a diagram showing an example of the circuit configuration of the transmitting device in a third embodiment.

An example of the circuit configuration of the transmitting device 100 in a third embodiment will hereinafter be explained with reference to FIG. 10. FIG. 10 is a block diagram showing the example of the circuit configuration of the transmitting device 100 in the third embodiment.

The transmitting device 100 in the third embodiment is, as illustrated in FIG. 10, configured so that outputs from the spatial interleaver 113 are inputted to the preceding unit 116, and other components such as the FEC encoder 111, the puncturing unit 112, the frequency interleaver 114 and the constellation mapper 115 are provided one by one.

With this configuration, unlike the second embodiment, the encoding process, the puncturing process, the frequency interleaving process and the constellation mapping process with respect to the transmission bit sequence are solely executed by the respective function units.

Figure 11:
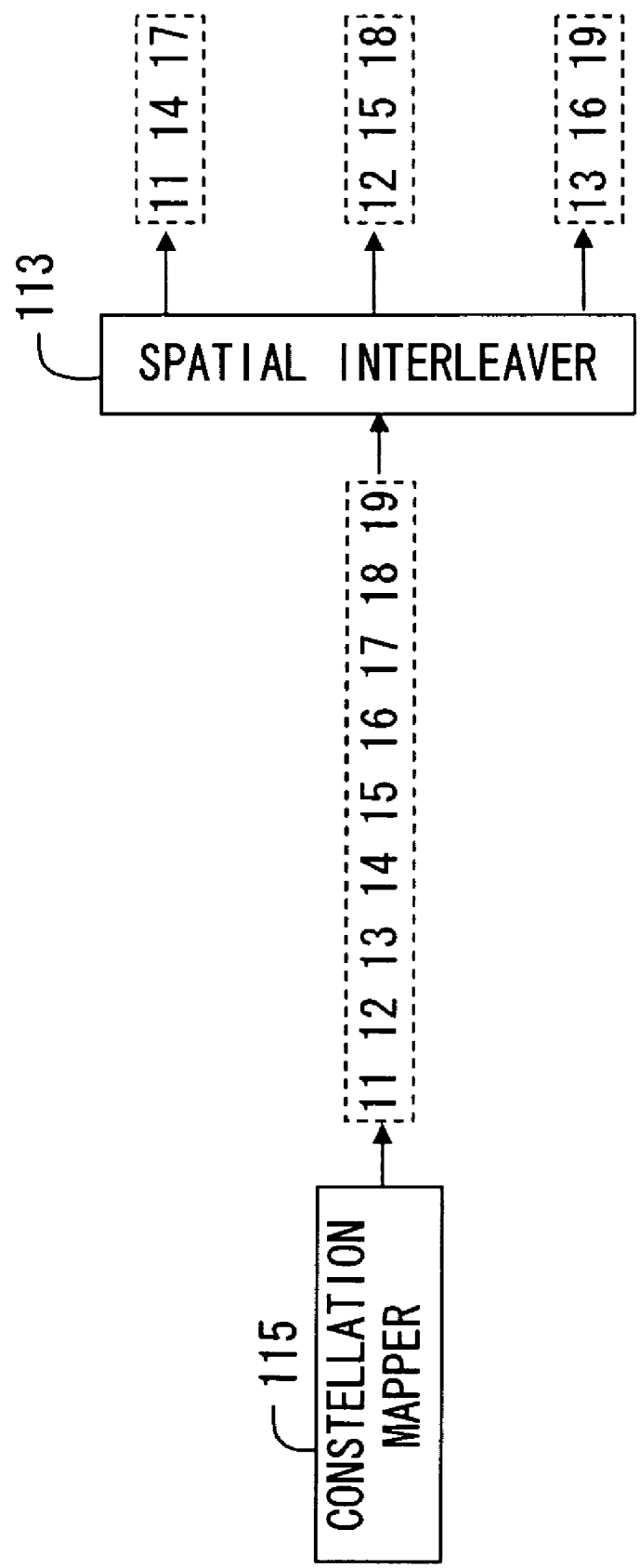
FIG. 11 is a diagram showing an example of the spatial interleaving in the third embodiment.

The spatial interleaver 113, when receiving from the constellation mapper 115 the signals modulated by the predetermined constellation, partitions these signals into the plurality of data streams as shown in FIG. 11 so as to actualize the spatial interleaving. FIG. 11 is a diagram showing an example of the spatial interleaving in the third embodiment. The numerals inputted to or outputted from the spatial interleaver 113 shown in FIG. 11 represent data indexes. The example in FIG. 11 is that the transmission data sequence subjected to the predetermined processing is inputted to and is partitioned by the spatial interleaver 113 into the data streams in sequence on a data-by-data basis.

Receiving Device

Figure 12:
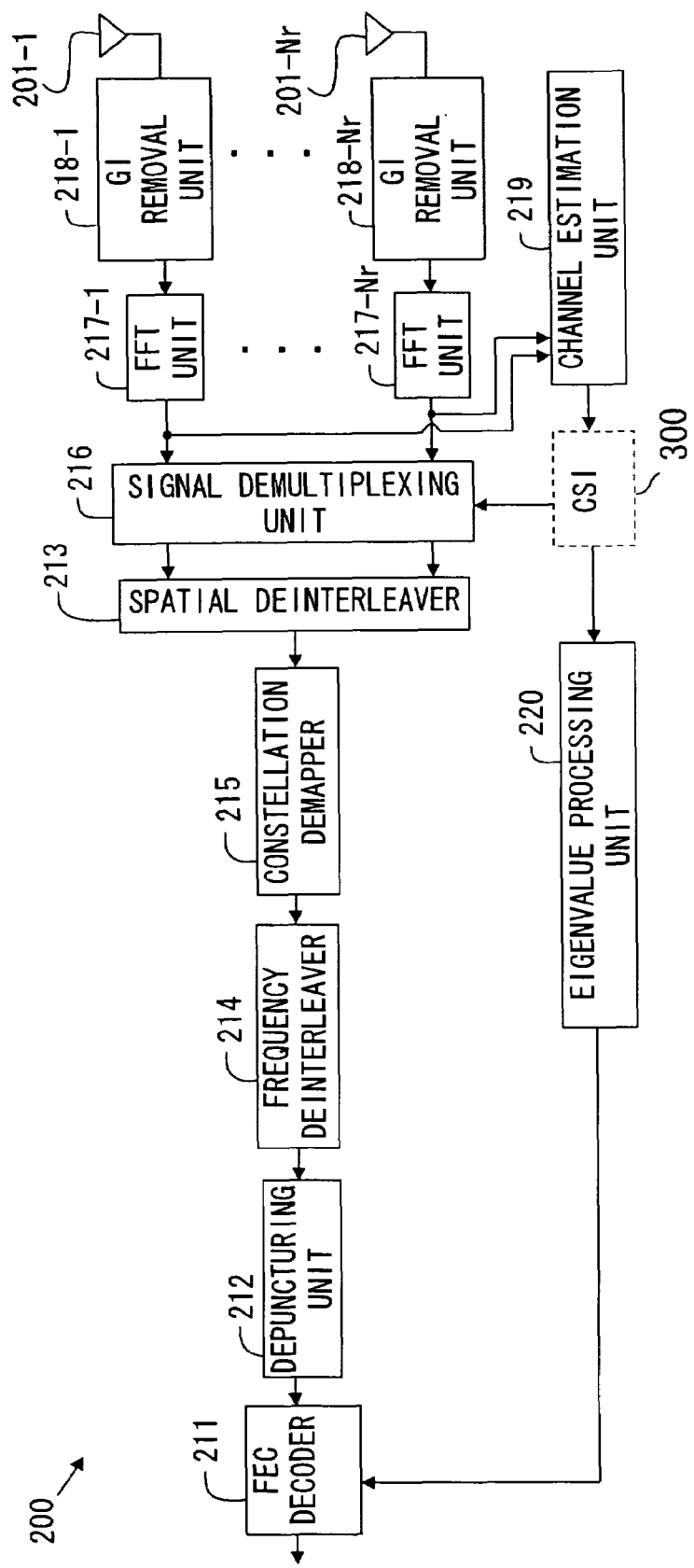
FIG. 12 is a diagram showing an example of the circuit configuration of the receiving device in the third embodiment.

An example of the circuit configuration of the receiving device 200 in the third embodiment will hereinafter be explained with reference to FIG. 12. FIG. 12 is a block diagram showing the example of the circuit configuration of the receiving device 200 in the third embodiment.

The receiving device 200 in the third embodiment, as illustrated in FIG. 12, the respective function units being formed so as to be adapted to the configuration of the transmitting device 100 described above, is configured so that the Ns-pieces of signals (data streams) demultiplexed by the signal demultiplexing unit 216 are inputted to the spatial deinterleaver 213, and other components such as the constellation demapper 215, the frequency deinterleaver 214, the depuncturing unit 212 and the FEC decoder 211 are provided one by one.

With such a configuration, the Ns-pieces of data streams demultiplexed by the signal demultiplexing unit 216 are inputted to the spatial deinterleaver 213, and the order rearranged by the spatial interleaver 113 is recovered to the original bit order. Thereafter, as in the first embodiment, the respective function units execute the constellation demapping process, the frequency deinterleaving process, the depuncturing process and the Viterbi decoding process.

According to the third embodiment, in the transmitting device, the FEC encoder, the puncturing unit, the frequency interleaver and the constellation mapper can be singly configured, while in the receiving device, the constellation demapper, the frequency deinterleaver, the depuncturing unit and the FEC decoder can be each singly configured, whereby the circuit scale of the device can be restrained.

Fourth Embodiment

The MIMO-OFDM wireless communication system according to a fourth embodiment of the present invention will hereinafter be described.

Transmitting Device

Figure 13:
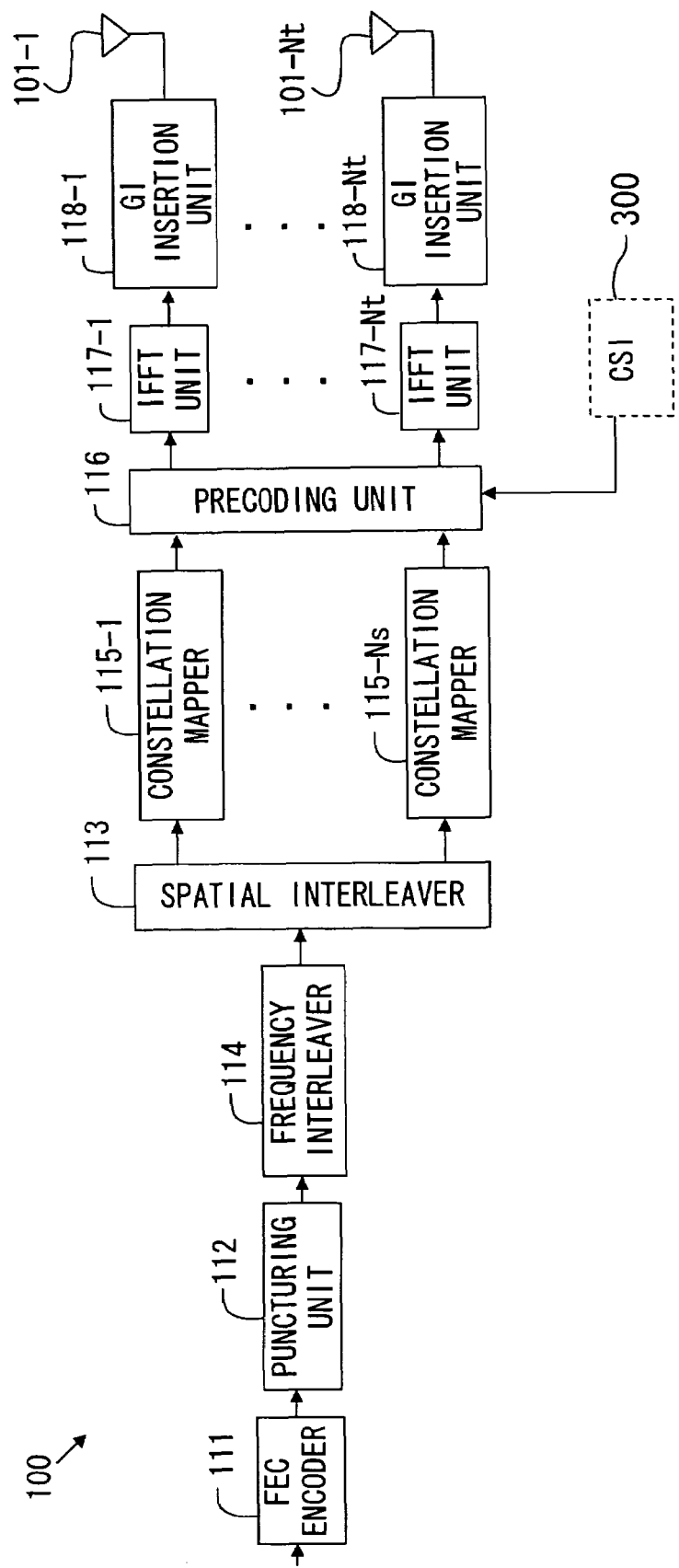
FIG. 13 is a diagram showing an example of the circuit configuration of the transmitting device in a fourth embodiment.

An example of the circuit configuration of the transmitting device 100 in a fourth embodiment will hereinafter be described with reference to FIG. 13. FIG. 13 is a block diagram showing the example of the circuit configuration of the transmitting device 100 in the fourth embodiment.

The transmitting device 100 in the fourth embodiment is, as shown in FIG. 13, configured so that the respective outputs from the spatial interleaver 113 are inputted to the constellation mappers 115-1 through 115-Ns, and other components such as the FEC encoder 111, the puncturing unit 112 and the frequency interleaver 114 are provided one by one.

With this configuration, the data streams partitioned by the spatial interleaver 113 are subjected to the constellation mapping process, and it follows that other processes such as the encoding process, the puncturing process and the frequency interleaving process are executed with respect to the transmission bit sequence. Note that the partition by the spatial interleaver 113 may be done by use of the preset block size s exemplified in the first embodiment.

Receiving Device

Figure 14:
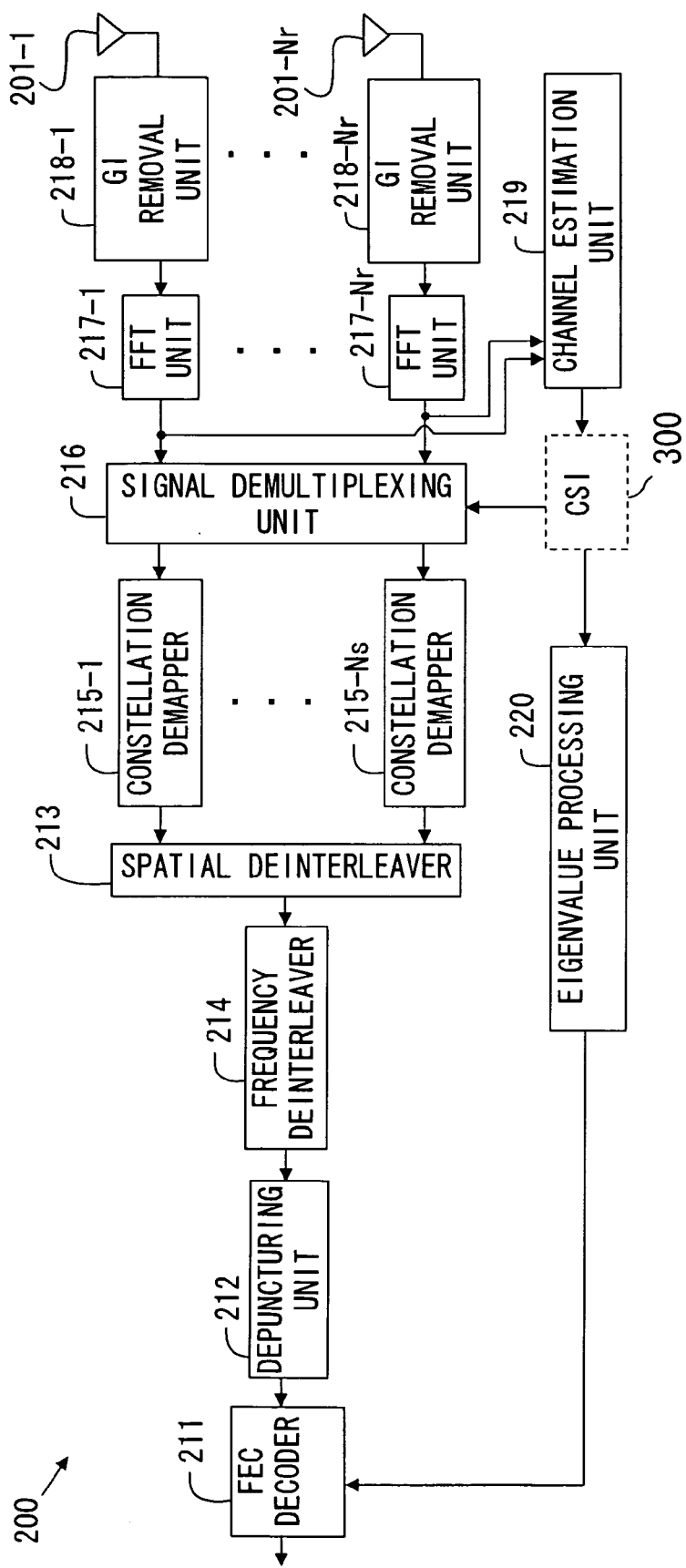
FIG. 14 is a diagram showing an example of the circuit configuration of the receiving device in the fourth embodiment.

An example of the circuit configuration of the receiving device 200 in the fourth embodiment will hereinafter be described with reference to FIG. 14. FIG. 14 is a block diagram showing the example of the circuit configuration of the receiving device 200 in the fourth embodiment.

The receiving device 200 in the fourth embodiment, as shown in FIG. 14, the respective function units being formed so as to be adapted to the configuration of the transmitting device 100 described above, is configured so that the respective outputs from constellation demappers 215-1 through 215-Ns are inputted to the spatial deinterleaver 213, and other components such as the frequency deinterleaver 214, the depuncturing unit 212 and the FEC decoder 211 are provided one by one.

With such a configuration, the data streams demapped by the constellation demappers 215-1 through 215-Ns are inputted to the spatial deinterleaver 213, and the order rearranged by the spatial interleaver 113 is recovered to the original bit order. Thereafter, as in the first embodiment, the respective function units execute the frequency deinterleaving process, the depuncturing process and the Viterbi decoding process.

According to the fourth embodiment, in the transmitting device, the FEC encoder, the puncturing unit and the frequency interleaver can be configured one by one, while in the receiving device, the frequency deinterleaver, the depuncturing unit and the FEC decoder can be configured one by one, whereby the circuit scale of the device can be restrained. On the other hand, the constellation mapper and the constellation demapper are each configured to be capable of the parallel processing, and hence the high-speed processing can be actualized without enhancing the performance of each of these function units themselves.

Fifth Embodiment

The MIMO-OFDM wireless communication system according to a fifth embodiment of the present invention will hereinafter be explained.

Transmitting Device

Figure 15:
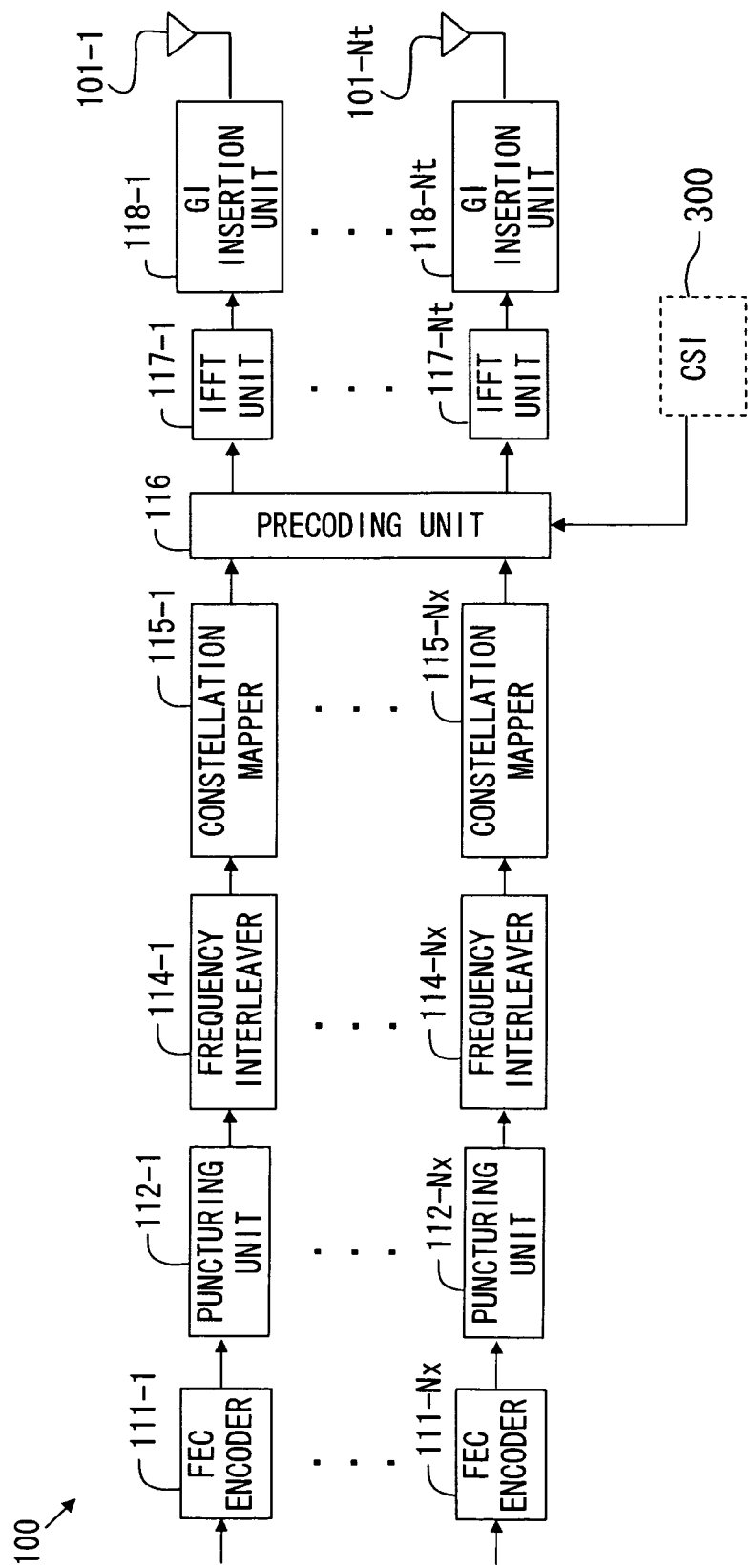
FIG. 15 is a diagram showing an example of the circuit configuration of the transmitting device in a fifth embodiment.

An example of the circuit configuration of the transmitting device 100 in a fifth embodiment will hereinafter be described with reference to FIG. 15. FIG. 15 is a block diagram showing the example of the circuit configuration of the transmitting device 100 in the fifth embodiment.

The transmitting device 100 in the fifth embodiment does not include the spatial interleaver 113 in the circuit configuration in the second embodiment. Namely, the transmitting device 100 is configured so as to include the FEC encoders 111-1 through 111-Nx, the puncturing units 112-1 through 112-Nx, the frequency interleavers 114-1 through 114-Nx and the constellation mappers 115-1 through 115-Nx, of which the numbers each correspond to the parallel process count Nx, wherein the respective outputs from the constellation mappers 115-1 through 115-Nx are inputted to the precoding unit 116.

With this configuration, the individual function units execute the signal processing with respect to the respective data streams split for the parallel processing without being spatially interleaved, and the data streams subjected to the processing are each inputted to the precoding unit 116.

Receiving Device

Figure 16:
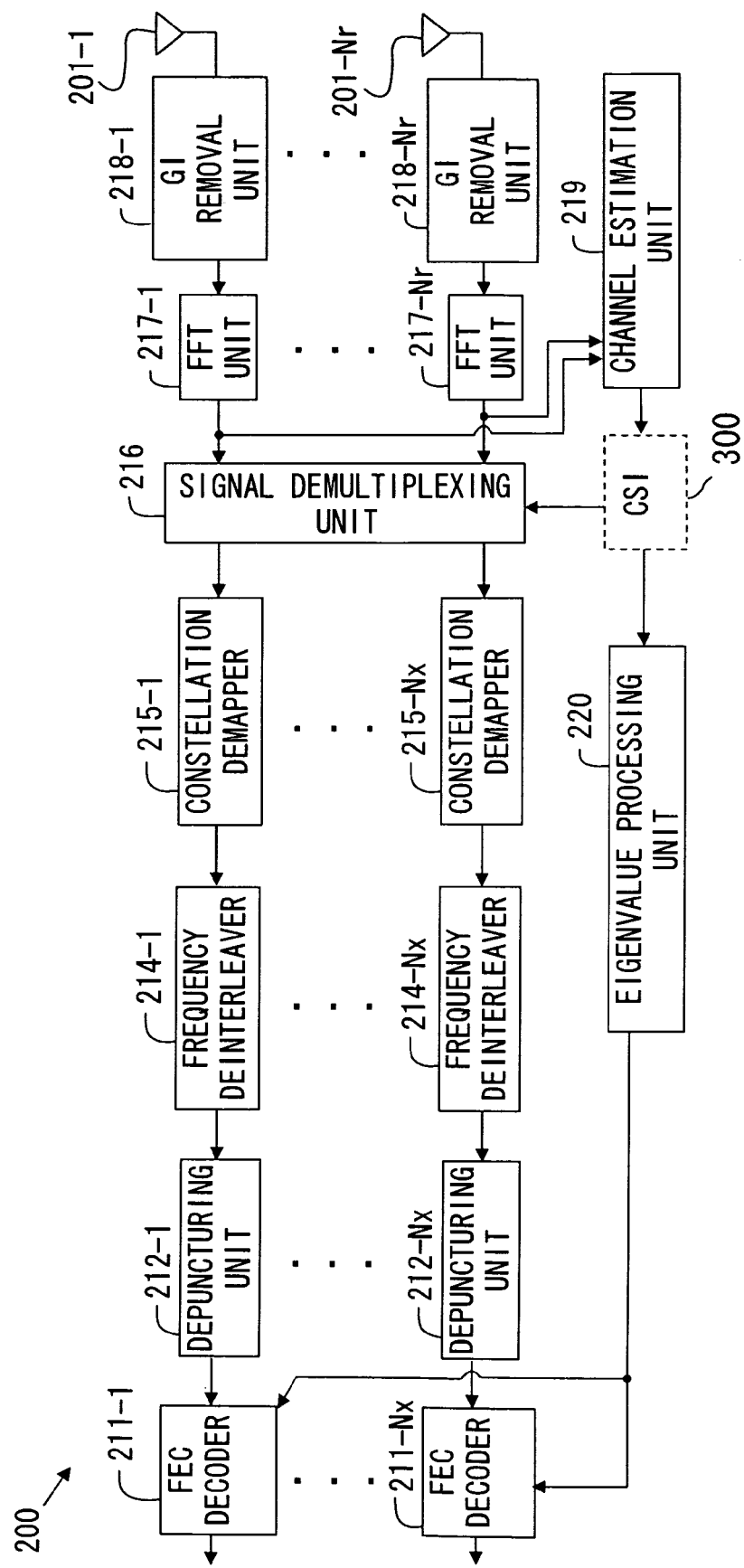
FIG. 16 is a diagram showing an example of the circuit configuration of the receiving device in the fifth embodiment.
Figure 17:
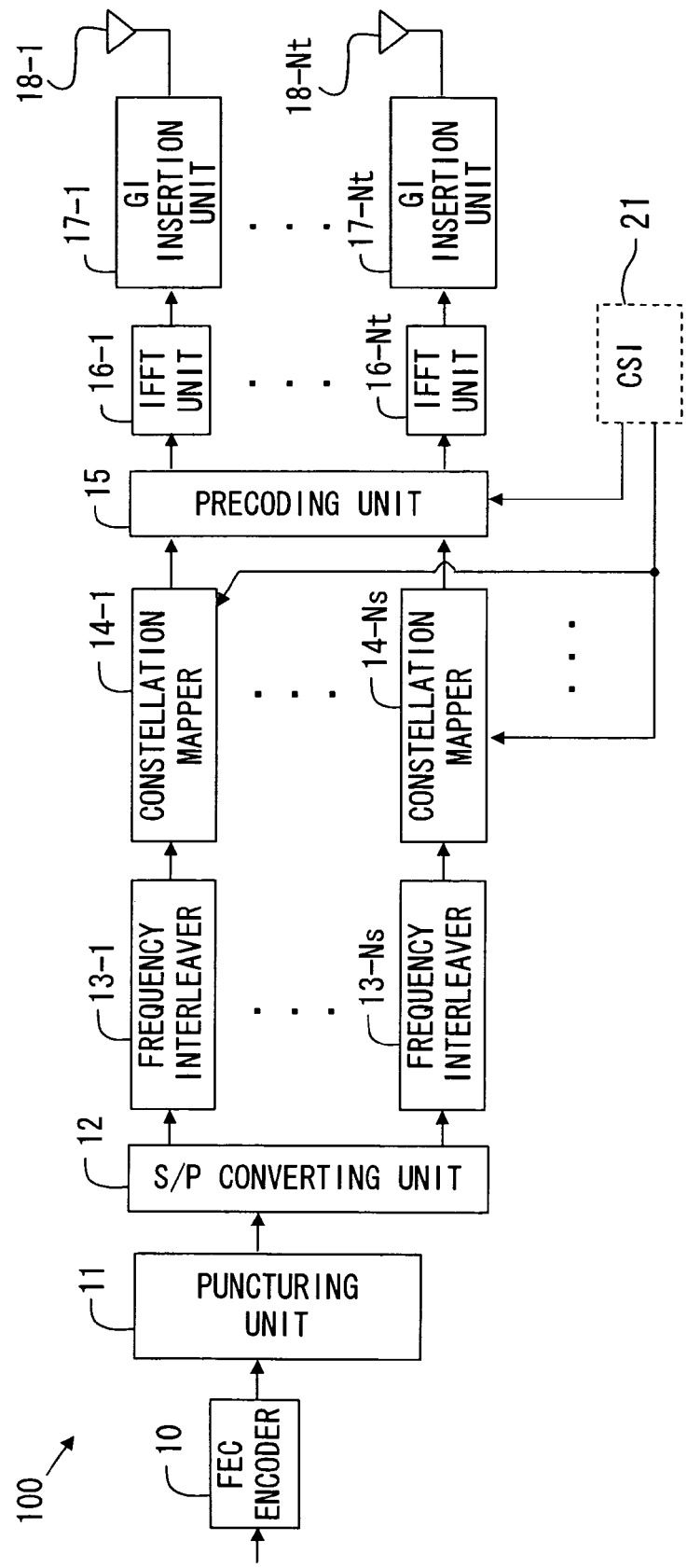
FIG. 17 is a diagram showing an example of a circuit configuration of a conventional MIMO-OFDM wireless communication system.

An example of the circuit configuration of the receiving device 200 in the fifth embodiment will hereinafter be described with reference to FIG. 16. FIG. 16 is a block diagram showing the example of the circuit configuration of the receiving device 200 in the fifth embodiment.

The receiving device 200 in the fifth embodiment takes, as illustrated in FIG. 16, a configuration that removes the spatial deinterleaver 213 so as to be adapted to the configuration of the transmitting device 100 described above. To be specific, the receiving device 200 is configured so that the respective outputs from the signal demultiplexing unit 216 are inputted to the constellation demappers 215-1 through 215-Nx.

With such a configuration, the receiving signals are, after being demultiplexed by the signal demultiplexing unit 216 into the signals of which the number corresponds to the parallel process count Nx in the transmitting device 100 described above, inputted to the constellation demappers 215-1 through 215-Ns.

According to the fifth embodiment, in transmitting device, the FEC encoder, the puncturing unit, the frequency interleaver and the constellation mapper are each configured so as to be capable of the parallel processing, while in the receiving device, the constellation demapper, the frequency deinterleaver, the depuncturing unit and the FEC decoder are each configured so as to be capable of the parallel processing, and it is therefore possible to actualize the high-speed processing without enhancing the performance of each of these function units themselves. The transmitting device and the receiving device in the fifth embodiment have the configurations inferior in their error rate performance to those in the other embodiments because of utilizing none of the spatial interleaver.

Others

The disclosures of Japanese patent application No. JP2006-043794, filed on Feb. 21, 2006 including the specification, drawings and abstract are incorporated herein by reference.

What is claimed is:

1. A wireless communication system in which a transmitting device having a plurality of transmitting antennas and a receiving device having a plurality of receiving antennas communicate in an orthogonal frequency division multiplexing system, said transmitting device comprising:

a status acquiring unit acquiring a channel matrix generated by previous signals from said receiving device;

a partition unit partitioning a transmission data sequence into a plurality of data streams; and a mapping unit mapping each of the plurality of data streams to each of the plurality of transmitting antennas by using, for a precoding matrix, columns, corresponding to a stream count of the plurality of data streams, of a right singular matrix acquired by singular value decomposition of the channel matrix, and said receiving device comprising:

an estimation unit estimating a present channel status from received signals and generating a present channel matrix representing the present channel status; and a decoding unit Viterbi-decoding the received signals by weighting a path metric by using a weighting coefficient corresponding to a signal-to-noise ratio obtained from the present channel matrix.

2. A wireless communication system according to claim 1, wherein said decoding unit sets, as the weighting coefficient, eigenvalues obtained by singular value decomposition of the present channel matrix.

3. A wireless communication system according to claim 1, wherein said decoding unit uses the weighting coefficient corresponding to a signal-to-noise ratio calculated based on elements of a matrix obtained by multiplying the present channel matrix by the preceding matrix acquired by singular value decomposition of the channel matrix generated by the previous signals.

4. A wireless communication system according to claim 2, said transmitting device further comprising
   a modulating unit determining constellation of data symbols with respect to each of the plurality of data streams, and
said receiving device further comprising
   a detecting unit detecting the constellation of the data symbols with respect to such received data streams that the received signals are demultiplexed into the signals corresponding to the stream count of the plurality of data streams.

5. A wireless communication system according to claim 4, said transmitting device further comprising
   a frequency mapping unit mapping the data symbols, with respect to each of the plurality of data streams, to subcarrier frequencies, and
said receiving device further comprising
   an acquiring unit acquiring the data symbol from the subcarrier frequency with respect to each of the received data streams.

6. A receiving device communicating with a transmitting device partitioning a transmission data sequence into a plurality of data streams and transmitting the plurality of data streams by mapping to a plurality of transmitting antennas in an orthogonal frequency division multiplexing system, comprising:
   an estimation unit estimating a present channel status from received signals and generating a present channel matrix representing the present channel status; and
   a decoding unit Viterbi-decoding the received signals by weighting a path metric by using a weighting coefficient corresponding to a signal-to-noise ratio obtained from the present channel matrix.

7. A receiving device according to claim 6, wherein said decoding unit sets, as the weighting coefficient, eigenvalues obtained by singular value decomposition of the present channel matrix.

8. A receiving device according to claim 7, further comprising a detecting unit detecting the constellation of the data symbols with respect to such received data streams that the received signals are demultiplexed into the signals corresponding to the stream count of the plurality of data streams.

9. A receiving device according to claim 8, further comprising an acquiring unit acquiring the data symbol from the subcarrier frequency with respect to each of the received data streams.

10. A receiving device according to claim 6, wherein said decoding unit uses the weighting coefficient corresponding to a signal-to-noise ratio calculated based on elements of a matrix obtained by multiplying the present channel matrix by a partial matrix of a right singular matrix acquired by singular value decomposition of the channel matrix generated by the previous signals.

* * * * *

UNITED STATES PATENT AND TRADEMARK OFFICE
CERTIFICATE OF CORRECTION

PATENT NO. : 7,272,294 B2
APPLICATION NO. : 11/415113
DATED : September 18, 2007
INVENTOR(S) : Liang Zhou et al.

It is certified that error appears in the above-identified patent and that said Letters Patent is hereby corrected as shown below:

IN THE CLAIMS

In column 19, line 13, in Claim 3, delete "preceding" and insert --precoding-- therefor.

Signed and Sealed this

Thirteenth Day of May, 2008

JON W. DUDAS
*Director of the United States Patent and Trademark Office*